(12) United States Patent
Djordjevic et al.

(10) Patent No.: US 10,912,008 B2
(45) Date of Patent: Feb. 2, 2021

(54) METHOD AND APPARATUSES FOR ATTACHING A RADIO BASE STATION TO A CORE NETWORK NODE

(71) Applicant: Telefonaktiebolaget LM Ericsson (publ), Stockholm (SE)

(72) Inventors: Branko Djordjevic, Herzogenrath (DE); Andreas Witzel, Herzogenrath (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 8 days.

(21) Appl. No.: 16/341,225

(22) PCT Filed: Oct. 20, 2016

(86) PCT No.: PCT/EP2016/075273
§ 371 (c)(1),
(2) Date: Apr. 11, 2019

(87) PCT Pub. No.: WO2018/072833
PCT Pub. Date: Apr. 26, 2018

(65) Prior Publication Data
US 2019/0320376 A1 Oct. 17, 2019

(51) Int. Cl.
*H04W 40/22* (2009.01)
*H04B 17/318* (2015.01)
(Continued)

(52) U.S. Cl.
CPC .......... *H04W 40/22* (2013.01); *H04B 17/318* (2015.01); *H04L 43/0811* (2013.01); *H04L 45/28* (2013.01); *H04W 88/04* (2013.01)

(58) Field of Classification Search
CPC . H04W 36/30; H04W 84/042; H04W 84/047; H04W 88/04
See application file for complete search history.

(56) References Cited

U.S. PATENT DOCUMENTS 9,521,605 B2 * 12/2016 Oh .................. H04W 36/30
2009/0252088 A1 10/2009 Rao et al.
(Continued)

OTHER PUBLICATIONS

ZTE Corporation, "SDN Application for Transport Network", ITU-T draft, Jan. 29, 2013, pp. 1-5, International Telecommunication Union, Geneva, CH.

(Continued)

*Primary Examiner* — Melanie Jagannathan
(74) *Attorney, Agent, or Firm* — Sage Patent Group

(57) ABSTRACT

A method for attaching a first radio base station (RBS) to a core network via a radio access network (RAN), wherein a forwarding of data within the RAN is being controlled by a Software Defined Network, SDN, Controller, the RAN comprising a plurality of further RBSs being capable of providing radio connection to a plurality of UEs, and being under the control of the SDN Controller. At least one UE from the plurality of UEs is selected, wherein the selected at least one UE is located within an overlapping radio connectivity area of the first RBS and one of the further RBSs, denoted as a second RBS. The SDN Controller activates control onto the at least one selected UE. The SDN Controller connects the first RBS to the second RBS via the radio connections of the at least one selected UE. The SDN Controller enables the forwarding of data between the first RBS and the core network via the second RBS.

26 Claims, 12 Drawing Sheets

(51) Int. Cl.
  *H04L 12/26* (2006.01)
  *H04L 12/703* (2013.01)
  *H04W 88/04* (2009.01)

(56) References Cited

U.S. PATENT DOCUMENTS

| | | | |
|---|---|---|---|
| 2009/0285133 A1* | 11/2009 | Rao | H04W 84/047 370/279 |
| 2013/0143573 A1* | 6/2013 | Basu Mallick | H04W 36/0072 455/437 |
| 2013/0322325 A1* | 12/2013 | Hahn | H04W 36/0009 370/315 |
| 2014/0057634 A1* | 2/2014 | Chang | H04W 36/32 455/437 |
| 2014/0126410 A1* | 5/2014 | Agarwal | H04W 36/32 370/252 |
| 2015/0055623 A1 | 2/2015 | Li et al. | |
| 2015/0111594 A1* | 4/2015 | Cui | H04W 40/026 455/453 |
| 2015/0365294 A1* | 12/2015 | Khan | H04W 76/34 370/254 |
| 2017/0127427 A1* | 5/2017 | Claridge | H04W 72/085 |
| 2018/0124657 A1* | 5/2018 | Hedlund | H04W 36/0055 |
| 2018/0146509 A1* | 5/2018 | Ruffini | H04W 88/085 |
| 2018/0234345 A1* | 8/2018 | Fondelli | H04L 47/24 |
| 2019/0075497 A1* | 3/2019 | Zhu | H04W 36/0066 |

OTHER PUBLICATIONS

3rd Generation Partnership Project, LTE; Evolved Universal Terrestrial Radio Access Network (E-UTRAN); X2 general aspects and principles (3GPP TS 36.420 version 13.0.0 Release 13), Technical Specification, ETSI TS 136 420 V13.0.0, Jan. 1, 2016, pp. 1-15, ETSI.

3rd Generation Partnership Project, "LTE; Evolved Universal Terrestrial Radio Access Network (E-UTRAN); S1 general aspects and principles (3GPP TS 36.410 version 13.0.0 Release 13)", Technical Specification, ETSI TS 136 410 V13.0.0, Jan. 1, 2016, pp. 1-17, ETSI.

* cited by examiner

METHOD AND APPARATUSES FOR ATTACHING A RADIO BASE STATION TO A CORE NETWORK NODE

TECHNICAL FIELD

The present disclosure generally relates to a technique and apparatus for attaching a radio base station to a core network via a radio access network.

BACKGROUND

In a modern telecommunication network the radio access network (RAN) is often adapted to provide overlapping radio coverage to mobile stations or user equipment (UE) by a distribution of radio base stations, often denoted as NodeB (NB) or enhanced NodeB (eNB). This allows e.g. utilizing dual connectivity for a user equipment (UE) such that a UE utilizes two or more radio links in parallel for increasing bandwidth. The principle of overlapping radio coverage will further be extended with the introduction of 5G technology. In LTE (Long Term Evolution) a logical interface (X2) according to 3GPP standard 36.420 V13.0.0 has been introduced to provide an interface between two eNB within the Evolved Universal Terrestrial Radio Access Network (E-UTRAN) architecture in LTE. From a logical standpoint, the X2 interface is a point-to-point interface between two eNBs within the E-UTRAN. A point-to-point logical interface should be feasible even in the absence of a physical direct connection between the two eNBs. Further the X2 interface is adapted to support the exchange of signalling information between two eNBs. In addition the interface is adapted to support the forwarding of Protocol Data Units (PDUs) to the respective tunnel endpoints. The eNBs are further connected via a S1 interface according to 3GPP standard 36.410 V 13.0.0 to nodes in the core network (CN) of the telecommunication network. The S1 interface is a logical interface between an eNB and an Evolved Packet Core (EPC) in LTE, providing an interconnection point between the E-UTRAN and the EPC. It is also considered as a reference point. The S1 interface supports the exchange of signalling information between the eNB and EPC. From a logical standpoint, the S1 is a point-to-point interface between an eNB within the E-UTRAN and a Mobility Management Entity (MME) in the EPC. A point-to-point logical interface should be feasible even in the absence of a physical direct connection between the eNB and MME.

In case of maintenance or technical problems there may be a disruption of the S1 connection between a radio base station and the core network such that control and payload data cannot be send from the radio base station towards the core network node and vice versa. So even if the radio interface Uu is available between a UE and a radio base station it is not possible to serve the connected UEs properly. Accordingly there is a need of providing connectivity between a radio network node in the access network and a node in the core network even if the direct connection is not working.

SUMMARY

It is an object of the present invention to improve the connectivity between radio base stations in a radio access network and core network nodes. This object is achieved by the independent claims. Advantageous embodiments are described in the dependent claims.

According to a first aspect, a method for attaching a first radio base station to a core network via a radio access network is provided. A forwarding of data within the radio access network is being controlled by a Software Defined Network, SDN, Controller, the radio access network comprising a plurality of further radio base stations being capable of providing radio connection to a plurality of user equipment, UEs, and being under the control of the SDN Controller. The method comprising the steps of selecting at least one UE from the plurality of UEs, wherein the selected at least one UE is located within an overlapping radio connectivity area of the first radio base station and one of the further radio base stations, denoted as a second radio base station. Further the method comprises the steps of activating, by the SDN Controller, control of the SDN Controller onto the at least one selected UE, connecting, by the SDN Controller, the first radio base station to the second radio base station via the radio connections of the at least one selected UE, and enabling, by the SDN Controller, the forwarding of data between the first radio base station and the core network via the second radio base station.

According to a further aspect, a Software Defined Network, SDN, Controller for controlling a forwarding of data within a radio access network is provided. The SDN Controller is adapted to control a first radio base station of the radio access network and a plurality of further radio base stations of the radio access network, the first and the plurality of further radio base stations being capable of providing radio connection to a plurality of user equipment, UEs. The SDN Controller is adapted to receive a list of at least one selected UE from one of the plurality of further radio base stations, denoted as a second radio base station, activate control of the SDN Controller onto the at least one selected UE, connect the first radio base station to the second radio base station via the radio connections of the at least one selected UE, and enable the forwarding of data between the first radio base station and the core network via the second radio base station.

According to a further aspect, a radio base station in a radio access network is provided. The radio access network comprises a further radio base station, wherein a forwarding of data within the radio access network is being controlled by a Software Defined Network, SDN, Controller. The radio base station and the further radio base station are capable of providing radio connection to a plurality of user equipment, UEs, and being under the control of the SDN Controller. The radio base station is adapted to select at least one UE from the plurality of UEs, wherein the selected at least one UE is located within an overlapping radio connectivity area of the radio base station and the further radio base station, and indicate an identity of the at least one selected UE to the SDN Controller for activating control of the SDN Controller onto the at least one selected UE.

According to a further aspect, a radio base station in a radio access network is provided. The radio access network comprises a further radio base station, wherein a forwarding of data within the radio access network is being controlled by a Software Defined Network, SDN, Controller, and wherein the radio base station and the further radio base station being under the control of the SDN Controller. The radio base station is adapted to receive instructions from the SDN controller, activate an SDN client for forwarding of data, and thereby enabling control of the SDN Controller onto the radio base station, and receive configuration instructions to forward data destined to a core network and to the further radio base station.

According to a further aspect a user equipment, UE, is provided. The UE being capable of having radio connectivity to a first radio base station of a radio access network and to a second radio base station of the same radio access network when being located in an overlapping radio coverage area. The first radio base station, the second radio base station and the UE are under the control of a Software Defined Network, SDN, Controller, which controls a forwarding of data within the radio access network. The UE being adapted to send a measurement report to the second radio base station, wherein the measurement reports comprise radio strength indicators for both, a radio connection between the UE and the first radio base station, and a radio connection between the UE and the second radio base station, receive a request from the SDN Controller for activating an SDN client for forwarding of data, receive a configuration information for the SDN client for forwarding of data between the first radio base station and the second radio base station, and activate the SDN client for forwarding of data.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals. Further the present invention also concern a carrier containing the respective computer programs, wherein the carrier is one of an electronic signal, optical signal, radio signal, or computer readable storage medium.

BRIEF DESCRIPTION OF THE FIGURES

In the following, the invention will further be described with reference to exemplary embodiments illustrated in the figures, in which.

DETAILED DESCRIPTION

Figure 1:
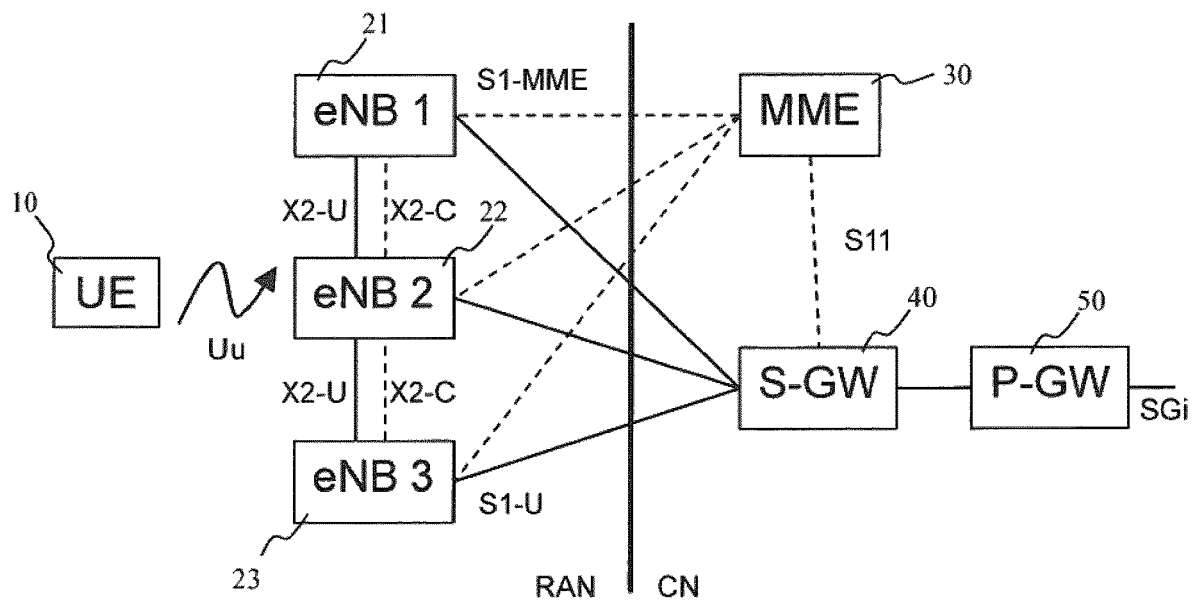
FIG. 1 shows a schematic illustration of an embodiment of a telecommunication network.

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with LTE standard terminology to illustrate the present invention, they are equally applicable to other kinds of mobile communication systems. Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company or the Internet.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "telecommunication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, WLAN, Wi-Fi), mobile backhaul network, or core network such as IMS, CS Core, PS Core.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC (Mobile Switching Center), MME (Mobility Management Entity), SGSN (Serving Gateway Support Node), P-CSCF (Proxy Call State Control Function), S-CSCF (Serving-CSCF), or TAS (Telephony Application Server) node.

Within the context of the present application the term "radio base station" may particularly refer to a node of a radio access network that is used as interface between land-based transport links and radio based transport links, wherein the radio based transport link interfaces directly a user equipment. For example, in a GSM/2G access network a radio base station refers to a BTS, in a WCDMA/3G access network a radio base station refers to a NodeB, and in a LTE access network a radio base station refers to a eNodeB. In a WLAN/Wi-Fi architecture a radio base station refers to an Access Point (AP).

The illustration in the drawing is schematic. In different drawings, similar or identical elements are provided with the same reference signs or with reference signs which are different from one another in the first digit.

FIG. 1 shows a schematic illustration of an embodiment of a telecommunication network. The telecommunication network is divided into a radio access network (RAN) part and a core network (CN) part. The radio access network comprises a plurality of radio base stations 21, 22, 23. In particular the radio base stations are named as eNB because FIG. 1 refers to an example of an LTE access network. However it is also possible to implement this embodiment in a Universal Mobile Telecommunication System (UMTS)/3G or Global System for Mobile communication (GSM)/2G access network. Further this embodiment may also be implemented in an access network of a future 5G network. The radio base stations 21, 22, 23 are capable of providing radio connectivity to a plurality of user equipment. In FIG. 1 only one UE 10 is depicted for keeping the figure simple. The different eNBs 21, 22, 23 may also further be capable to provide overlapping radio connectivity for the UE 10 such that the UE 10 is able to establish a radio connection to more than one eNB 21, 22, 23 at the same time. The radio base stations or eNBs 21, 22, 23 are connected towards each other via X2 interface wherein a solid line represents the connection via the X2-U interface for payload data such as voice, video or other data. The dotted line represents the connection via the X2-C interface for exchange of control data. The solid and dotted lines may only represent a logical connection. The physical connection may include further nodes which have not been depicted. The UE 10 has a radio connection via the Uu interface to at least one of the eNB 21, 22, 23. The radio base stations 21, 22, 23 are further logically connected to nodes 30, 40 in the core network CN. Each of the eNBs 21, 22, 23 is logically connected via a S1-MME interface with a control node in the EPC, MME 30.

The S1-MME interface is for control data exchange between the eNBs 21, 22, 23 and the MME 30. Payload data is exchanged via the logical S1-U interface between the eNBs 21, 22, 23 and the Serving Gateway, S-GW 40 which is connected further to a Packet Data Network, PDN, Gateway, P-GW 50.

Figure 2:
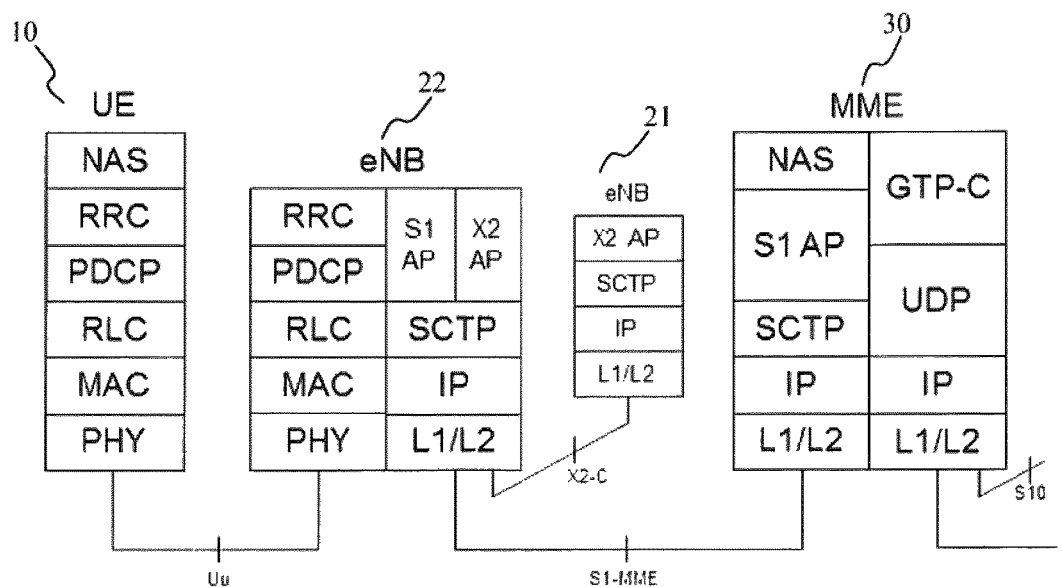
FIG. 2 shows a schematic illustration of a layered architecture of an embodiment of a telecommunication network.

FIG. 2 shows a schematic illustration of a layered architecture of an embodiment of a telecommunication network. The layered architecture of the UE 10 comprises different layers and is connected via a Uu interface with an eNB 22. Both, UE 10 and eNB 22, comprise the same layer structure for the first 5 layers, namely the physical (PHY) layer, the Media Access Control (MAC) layer, the Radio Link Control (RLC) layer, the Packet Data Convergence Protocol (PDCP) layer and the Radio Resource Control (RRC) layer. The eNB 22 is connected via a S1-MME interface with a control node of the core network, which is depicted as a MME 30 in the EPC. The S1-MME interface comprises a different layer structure, having the physical and data link layers L1/L2, the Internet Protocol (IP) layer and Stream Control Transmission Protocol (SCTP) layer. The interface further has an S1 application protocol layer for connection with the MME 30 and an X2 application protocol layer for a connection with a further eNB 21 via the X2-C interface.

Figure 3:
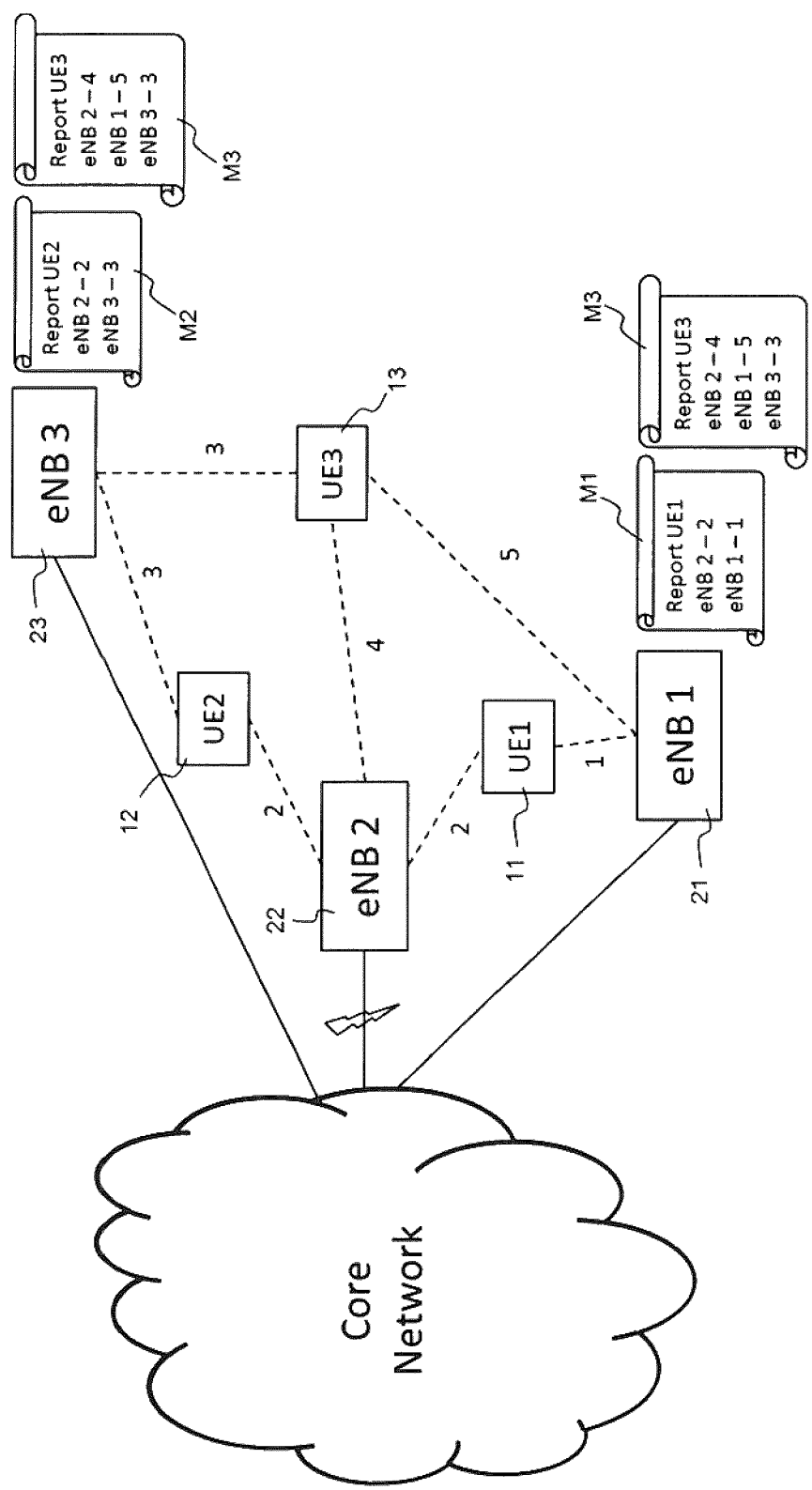
FIG. 3 shows a further example of a schematic illustration of an embodiment of a telecommunication network.

FIG. 3 depicts an example of a schematic illustration of an embodiment of an access network in a telecommunication network. The core network is only shown as a cloud to keep the figure simple. The FIG. 3 shows three radio base stations which are depicted as eNBs 21, 22, 23 according to LTE. It is possible to have more or less than three base stations. The embodiment of FIG. 3 shows three user equipment 11, 12, 13 which are connectable to some or all of the radio base stations 21, 22, 23 depending on the radio coverage of the radio base stations 21, 22, 23 and the position of the UEs 11, 12, 13. The radio base stations 21, 22, 23 are therefore capable of providing radio connection to some or all of the UEs 11, 12, 13. A dotted line between the UEs 11, 12, 13 and the eNBs 21, 22, 23 represents a radio connectivity between the UEs 11, 12, 13 and eNBs 21, 22, 23. A number at each dotted line shows a simplified representation of a radio strength indicator such that a low number represents a high radio strength/good radio connectivity and a high number represents a low radio strength/bad radio connectivity. As an example UE3 13 has a medium radio strength or connectivity to eNB3 23 and a low radio strength or connectivity towards eNB1 21. This setup could be based on the position of the UE3 13 and eNB3 23 and eNB1 21. It may also be possible that the cells of eNB3 23 and eNB1 21 have different size. It may also be possible that the different radio connectivity of eNB3 23 and eNB1 21 are based on different technology used for the radio connection.

In the depicted example of FIG. 3 the S1 connection between eNB2 22 and the core network is broken such that eNB2 22 is not able to send or receive any control and/or payload data towards/from the core network. In the following this eNB2 22 is also referred to as an isolated eNB or isolated radio base station wherein eNB1 21 and eNB3 23 which still have a connection to the core network are named as non-isolated eNBs or non-isolated radio base stations. The eNB2 22 in this example is an isolated eNB which is not connected to the core network any more. This may be a result of a technical malfunction or the connection has been temporarily interrupted because of maintenance. It is now proposed to re-connect this first radio base station eNB2 22 to the core network. This is done by selecting at least one UE from the plurality of UEs 11, 12, 13 for forwarding of data between the eNB2 22 which lost the S1 connection to the core network and a further eNB 21, 23 which is still connected to the core network via the S1 interface. The selected at least one UE must be located within an overlapping radio connectivity area of the eNB2 22 and one of the further base stations eNB1 21 or eNB3 23. In the embodiment of FIG. 3 it is assumed that all 3 UEs are located within an overlapping radio connectivity area of eNB2 and at least one further radio base station eNB1 21 or eNB3 23. It may therefore be possible to forward data from eNB2 22 via UE1 and eNB1 21 towards the core network and vice versa. Another possible route for the data from eNB2 22 is via UE3 13 and eNB3 23 towards the core network and vice versa. The third possible route in this example may be UE2 12 and eNB3 23. The forwarding of data is controlled by a non-depicted software defined network (SDN) controller which controls the eNBs 21, 22, 23 and the UEs 11, 12, 13. The SDN controller activates the control onto the at least one selected UE which should forward the data from the eNB2 22 towards the core network and vice versa. The SDN controller is further adapted to connect the eNB2 22 via the selected UE to a second radio base station which could be eNB1 21 or eNB3 23 in this embodiment of FIG. 3. The SDN controller further enables the forwarding of data between eNB2 22 and the core network via the selected second radio base station 21, 23.

The selection of at least one UE from the plurality of UEs 11, 12, 13 could be done based on the radio strength indicators which are applicable for each UE from the plurality of UEs 11, 12, 13 within the overlapping radio connectivity area. The radio strength indicators indicating radio strength between each UE from the plurality of UEs 11, 12, 13 and both the first radio base station 22 which lost the connectivity towards the core network and one of the further radio base stations 21, 23 which are connected to the core network. The selection of the at least one UE can be done at the base station 21, 23. In the example of FIG. 3 these radio base stations 21, 23 may be adapted to receive measurement reports from each UE from the plurality of UEs which are covered. Only measurement reports from UEs within the overlapping radio connectivity area with the first radio base station eNB2 22 which lost its connection to the core network are considered. A measurement report from a UE which does not have any radio connectivity to the eNB2 22 will not be taken into account. In FIG. 3 only those UEs 11, 12, 13 have been shown which are located in an overlapping radio connectivity area.

In this example eNB1 21 receives a measurement report M1 from UE1 11 reporting a radio strength indication "2" towards eNB2 and a radio strength indication "1" towards eNB1. A further measurement report from UE3 13 is received by eNB1 21 because UE3 is in a radio coverage area of eNB2 22 and in a radio coverage area of eNB1 21. UE3 reports three radio strength indicators because UE3 is additionally in the radio coverage area of eNB3 23. The measurement report M3 from UE3 indicates a bad radio strength "5" towards eNB1 21, a slightly bad radio strength "4" towards eNB2 22 and a medium radio strength towards eNB3 23. Further eNB3 23 receives also two measurement reports. One measurement report M3 from UE3 13 comprises the same indicators. The second measurement report M2 from UE2 comprises two radio strength indicators "2" and "3" towards eNB2 22 and eNB3 23. Both eNBs 21, 23 may then select a preferred UE for the forwarding of data from the isolated first eNB2 22 to the core network and vice versa. The selection could be done based on the received measurement reports.

In one possible embodiment a threshold is defined such that the radio strength indicators must indicate a radio strength which is higher than a minimum defined threshold to be selected as one of the at least one UEs 11, 12, 13 for the forward of data.

Figure 4:
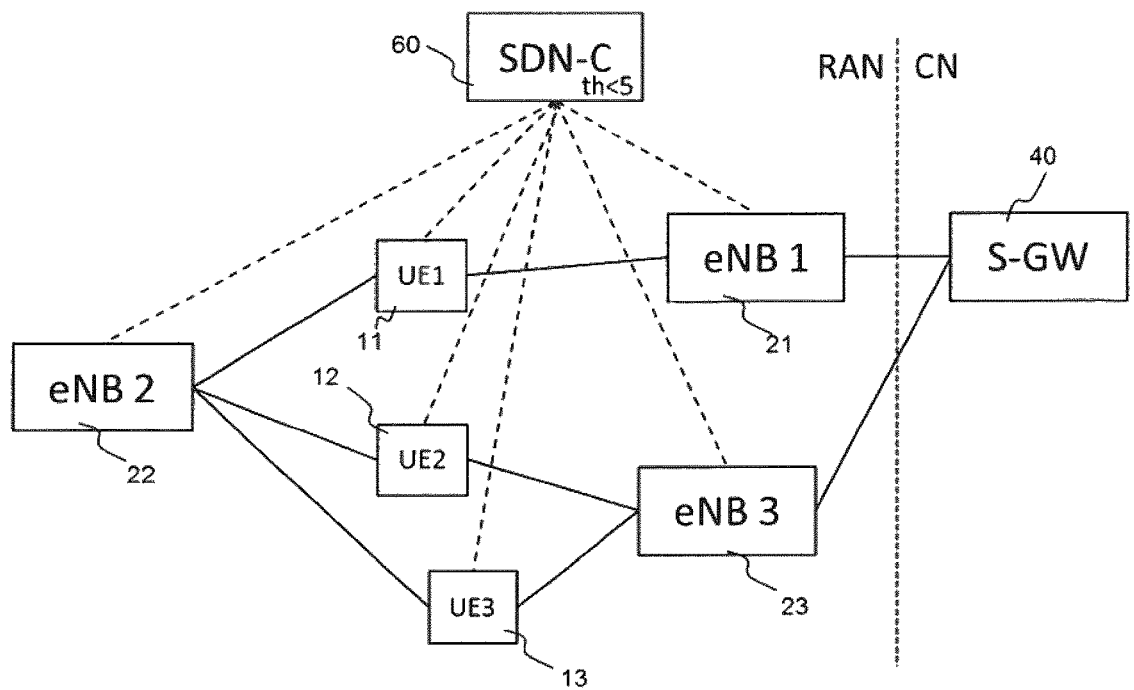
FIG. 4 shows a further example of a schematic illustration of an embodiment of a telecommunication network.
Figure 5:
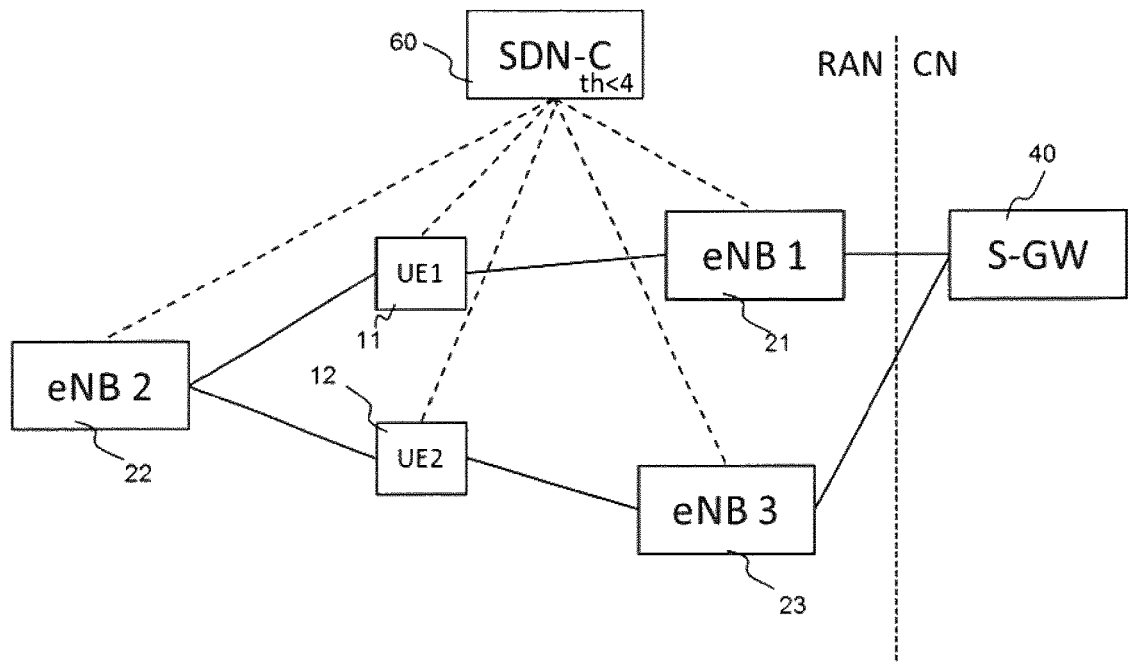
FIG. 5 shows a further example of a schematic illustration of an embodiment of a telecommunication network.

FIGS. 4 and 5 show embodiments which refer to the example structure of FIG. 3. In addition both figures comprise an SDN Controller 60 which is adapted to control the radio base stations eNB1 21, eNB2 22 and eNB3 23. Further the SDN-C 60 is adapted to control UE1 11, UE2, 12 and UE3 13 which is depicted via dotted lines. The connection between the SDN-C and a controlled device or node 11, 12, 13, 21, 22, 23 may not be a direct connection but routed via one of the other devices or nodes. Further both figures shows a S-GW 40 which is a Serving Gateway of an EPC located in the core network CN.

According to a first embodiment in FIG. 4 a threshold "th<5" has been set. Based on the provided measurement reports there is only one radio connection which does not fulfill the requirements. M3 of UE3 13 comprises one radio strength indicator with a value of 5 (radio connection between UE3 and eNB1). According to this requirement the data of eNB2 22 can be forwarded via UE2 12 or UE3 13 to eNB3 23 and S-GW 40. A further path is the forwarding via UE1 11 and eNB1 21 to S-GW 40. According to a second embodiment in FIG. 5 a threshold "th<4" has been set. Based on the provided measurement reports UE3 13 has been removed completely because the radio strength indicator towards eNB2 is above the defined threshold. Even if the radio strength indicator indicates a medium radio strength between UE3 13 and eNB3 23 it has been decided to remove UE3 13 because the lowest radio strength indication of a forwarding path influences the complete path as the bottleneck of the connection. Therefore FIG. 5 depicts an embodiment with only two remaining UEs 11, 12 as selected UEs for the forwarding of data from eNB2 22 via eNB1 21 or eNB3 23 towards S-GW 40 and vice versa.

The threshold may be set in the SDN-C 60 by an operator to influence the reliability of the forwarding of data. If the threshold is very low such that only a few nodes can be involved in the forwarding of data the risk of a network outage may be higher if UEs are leaving the overlapping radio connectivity area. On the other hand it is also a risk of having a slow data transmission if radio connections with low radio strength are used for the forwarding of data. It may be possible to adapt the threshold based on the number of UEs which are located in the overlapping radio connectivity area of the isolated eNB2 22 and one of the other non-isolated eNBs 21, 23. If only a few number of UEs are located in the overlapping radio connectivity area the threshold for the selection of UEs may be higher to allow the use of lower radio strength connections with the risk of bad connections and/or low bandwidth. In a further embodiment only one UE is selected based on the best radio strength indicator between the selected UE and the isolated eNB2 22.

According to a further embodiment the selection of the at least one UE for the forwarding of the data from the isolated eNB2 22 to the core network via a second eNB 21, 23 takes in addition into account the movement speed of a UE relative to the position of the isolated first radio base station. This can be done by defining a speed threshold which must be kept by the UE (e.g. speed must be slower than be predefined speed threshold). This will reduce the number of changes in the forwarding network because fast moving UEs may cause a fast re-determination of the at least one UE for the forwarding of the data by the SDN-C 60.

In an embodiment the identity of the determined or selected at least one UE from the plurality of UEs is reported to the SDN-C 60 for activating control of the SDN-C 60 onto the at least one selected UE. This can be done in a periodically way such that actuality of the setup is given. This period can be faster or slower, e.g. dependent on the size of the cells or the moving speed of the UEs. In a further embodiment the eNBs 21, 23 only send changes of the list of selected UEs to the SDN-C 60 in case a new UE must be implemented or an outdated UE must be removed from the group of selected UEs. This will reduce the amount of data to be sent to the SDN-C.

In a further embodiment the isolated first radio base station eNB2 22 may be attached to the radio access network via at least one of the selected UEs responsive to the detection of a loss of connectivity of the first radio base stations to the core network. This detection can be performed by a periodically topology discovery procedure of the SDN-C 60 with all radio base stations 21, 22, 23. It may be applicable that the SDN-C 60, based on the detection of a loss of connectivity, requests a list of the selected at least one UEs from one of the further, non-isolated, eNBs 21, 23. As an advantage the determination of the selected UEs can be done only in case of a loss of connectivity of the first, isolated base station eNB2 22. This will reduce computational effort in the radio base stations during normal time (no loss of connectivity detected). It may also be applicable that only one second radio base station is determined out of the plurality of further non-isolated radio base stations 21, 23 based on geographical positions of these radio base stations within the radio access network. One example is to select the second radio base station 21, 23 which is located closest to the first isolated radio base station eNB2 22. In the example of FIG. 3, assuming that this figure also shows the geographical distribution of the eNBs 21, 22, 23, eNB1 21 may be selected. Selecting the closest eNB as the second radio base station may influence the radio strength indication because there may be a higher chance to have UEs in the overlapping area with good radio connectivity indications. Another example is to select the second radio base station out of the plurality of radio base stations having most UEs located in the overlapping area.

According to a further embodiment the activating of control of the SDN Controller onto the at least one selected UE may comprise the steps of contacting the at least one selected UE, activating an SDN client on the at least one selected UE for forwarding of data and configuring the SDN client on the at least one selected UE for forwarding of data between the first radio base station and the second radio base station. The SDN client can be implemented as a software in a protected memory area of a UE such that only an SDN Controller is able to activate the SDN client. The SDN client is a client which is able to forward data according to a forwarding table to the correct receiver. The forwarding table can be provided and updated by the SDN Controller. Using of an SDN for the forwarding of data has the advantage that the UE does not need to provide much computing power to the client. The SDN client is a simple and easy system which forwards data packets according to a provided forwarding table. The calculation of the forwarding paths is done at the SDN controller which generates the relevant forwarding tables.

According to a further embodiment the step of connecting, by the SDN Controller, the first radio base station to the second radio base station via the radio connection of the at least one selected UE comprises the steps of contacting the first radio base station and activating an SDN client on the first radio base station for forwarding of data, and thereby enabling control of the SDN Controller onto the first radio base station.

The SDN Controller SDN-C 60 may be functionality comprised by a node of the radio access network. As an example the SDN-C 60 may be implemented in a radio base station or any other node in the RAN. According to another embodiment the SDN Controller may be implemented as a virtual function distributed across the radio base stations (including e.g. the isolated first eNB and/or the further radio base stations).

Figure 6:
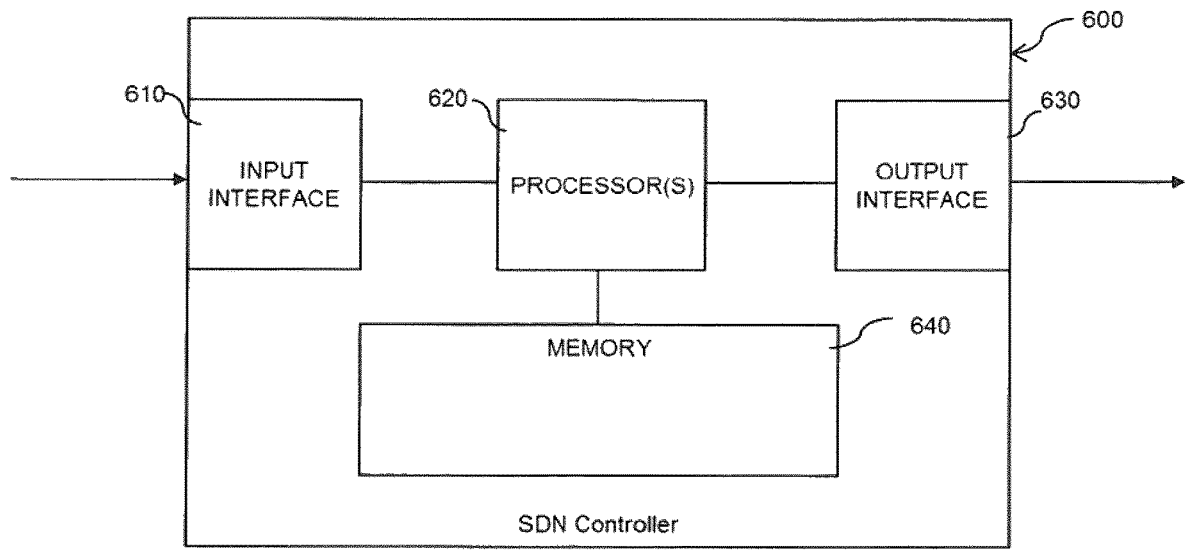
FIG. 6 shows a block diagram of an embodiment of a SDN Controller.

FIG. 6 shows a block diagram of an embodiment of a SDN Controller 600 for controlling a forwarding of data within a radio access network. The SDN Controller is adapted to control a first radio base station of the radio access network and a plurality of further radio base stations of the radio access network, the first and the plurality of further radio base stations being capable of providing radio connection to a plurality of UEs. The SDN Controller is adapted to receive a list of at least one selected UE from one of the plurality of further radio base stations, denoted as a second radio base station. The receiving step may be implemented by an Input Interface 610. The SDN Controller 600 is further adapted to activate control of the SDN Controller onto the at least one selected UE, to connect the first radio base station to the second radio base station via the radio connections of the at least one selected UE and to enable the forwarding of data between the first radio base station and the core network via the second radio base station.

According to a further embodiment the SDN Controller 600 for controlling a forwarding of data within a radio access network is provided. The SDN Controller 600 is adapted to control a first radio base station of the radio access network and a plurality of further radio base stations of the radio access network, the first and the plurality of further radio base stations being capable of providing radio connection to a plurality of user equipment, UEs, the SDN Controller 600 comprising a processor 620 and a memory 640, said memory 640 containing instructions executable by said processor 620. Said SDN Controller is operative to receive, e.g. via an Input Interface 610, indication of at least one selected UE from one of the plurality of further radio base stations, denoted as a second radio base station, activate, e.g. via an Output Interface 630, control onto the at least one selected UE, connecting the first radio base station to the second radio base station via the radio connections of the at least one selected UE, and enabling the forwarding of data between the first radio base station and a core network via the second radio base station.

According to a further embodiment the SDN Controller 600 for controlling a forwarding of data within a radio access network is provided. The SDN Controller 600 is adapted to control a first radio base station of the radio access network and a plurality of further radio base stations of the radio access network, the first and the plurality of further radio base stations being capable of providing radio connection to a plurality of user equipment, UEs. Said SDN Controller 600 comprises a receiving module 610 or Input Interface 610 adapted to receive indication of at least one selected UE from one of the plurality of further radio base stations, denoted as a second radio base station. The SDN Controller 600 further comprises an output module 630 or Output Interface 630 adapted to activate control onto the at least one selected UE, connecting the first radio base station to the second radio base station via the radio connections of the at least one selected UE and enabling the forwarding of data between the first radio base station and a core network via the second radio base station.

It is to be understood that the structure as illustrated in FIG. 6 is merely schematic and that the SDN Controller 600 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated. Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

Figure 7:
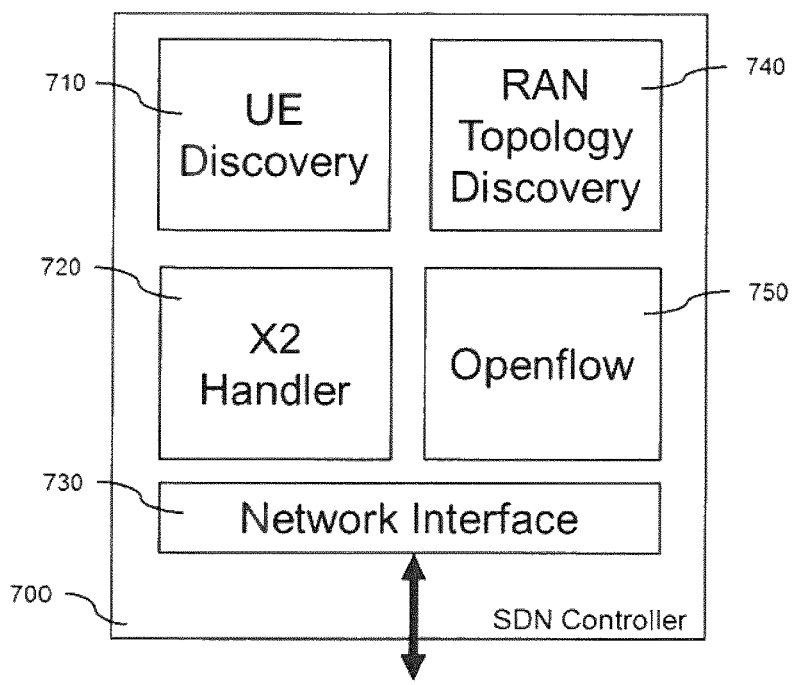
FIG. 7 shows a block diagram of a further embodiment of a SDN Controller.

FIG. 7 shows a block diagram of a further embodiment of a SDN Controller 700. In this embodiment of the SDN Controller 700 the SDN Controller is adapted to execute the determination or selection of the at least one UE out of the plurality of UEs which are adapted to forward the data from an isolated first eNB towards a non-isolated eNB. In previous embodiments this function may be executed in one of the non-isolated eNBs. The UE discovery function 710 constantly perform discovery of UEs in the overlapping areas of the isolated first eNB and non-isolated or second eNBs that can be used for X2 connectivity. The UE discovery function may also monitor the movement of the UEs relative to the isolated or non-isolated eNBs. If an UE is leaving the overlapping coverage area it is controlled removed from the X2 connectivity link aggregation. A RAN Topology Discovery function 740 is used to detect the eNBs in the RAN within the responsibility area of the SDN Controller 700. The RAN Topology Discovery can be done by using known topology discovery mechanisms and a heartbeat/maintenance messages for monitoring of the availability of the eNBs. Furthermore there is an OpenFlow stack client 750 to be used to communicate with OpenFlow clients in the UEs and eNBs. OpenFlow is a communication protocol that gives access to the forwarding plane of switches or router over the network. Further OpenFlow is an enabler of SDN. The SDN Controller further comprises an X2 handler 720 which is adapted to handle X2 connectivity via the UEs in the overlapping area. A network interface 730 is used as an interface for the SDN Controller 700 towards the controlled UEs and eNBs.

Figure 8:
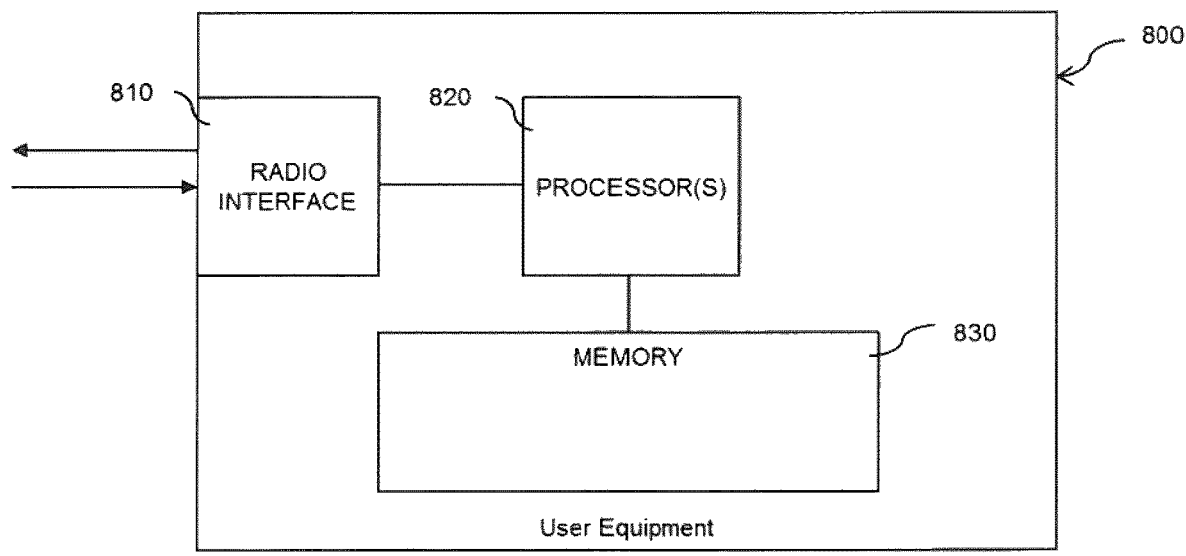
FIG. 8 shows a block diagram of an embodiment of a User Equipment.

FIG. 8 shows a block diagram of an embodiment of a User Equipment 800. The UE 800 is capable of having radio connectivity to a first radio base station of a radio access network and to a second radio base station of the same radio access network when being located in an overlapping radio coverage area. The first radio base station, the second radio base station and the UE 800 are under the control of a Software Defined Network, SDN, Controller, which controls a forwarding of data within the radio access network. The UE 800 is adapted to send, via a radio interface 810, a measurement report to the second radio base station, wherein the measurement reports comprise radio strength indicators for both, a radio connection between the UE 800 and the first radio base station, and a radio connection between the UE and the second radio base station. The UE 800 is further adapted to receive, via the radio interface 810, a request from the SDN Controller for activating an SDN client for forwarding of data, and to receive a configuration information for the SDN client for forwarding of data between the first radio base station and the second radio base stations, The UE 800 is further adapted to activate, via a processor 820, the SDN client for forwarding of data.

According to a further embodiment the User Equipment 800 is capable of having radio connectivity to a first radio base station of a radio access network and to a second radio base station of the same radio access network when being located in an overlapping radio coverage area. The first radio base station, the second radio base station and the UE 800 are under the control of a Software Defined Network, SDN, Controller 700, which controls a forwarding of data within the radio access network. The UE 800 comprises a processor 820 and a memory 830, said memory 830 containing instructions executable by said processor 820. Said UE 800 is operative to send, via the radio interface 810, a measurement report to the second radio base station, wherein the measurement reports comprise radio strength indicators for both, a radio connection between the UE and the first radio base station, and a radio connection between the UE and the second radio base station. The UE 800 is further operative to receive, via the radio interface 810, a request from the SDN Controller 700 for activating an SDN client for forwarding of data and to receive a configuration information for the SDN client for forwarding of data between the first radio base station and the second radio base stations. Further the UE 800 is operative to activate the SDN client for forwarding of data.

According to a further embodiment the User Equipment 800 is capable of having radio connectivity to a first radio base station of a radio access network and to a second radio base station of the same radio access network when being located in an overlapping radio coverage area. The first radio base station, the second radio base station and the UE 800 are under the control of a Software Defined Network, SDN, Controller 700, which controls a forwarding of data within the radio access network. The UE 800 comprises a sending module 810 or a radio interface 810 adapted to send a measurement report to the second radio base station, wherein the measurement reports comprise radio strength indicators for both, a radio connection between the UE and the first radio base station, and a radio connection between the UE and the second radio base station. The UE 800 further comprises a receiving module 810 or radio interface 810, operative to receive a request from the SDN Controller 700 for activating an SDN client for forwarding of data and to receive a configuration information for the SDN client for forwarding of data between the first radio base station and the second radio base stations. Further the UE 800 comprises an activation module 830 or processor 820, operative to activate the SDN client for forwarding of data.

It is to be understood that the structure as illustrated in FIG. 8 is merely schematic and that the UE 800 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated. Moreover, it is to be understood that the above concepts may be implemented by using correspondingly designed software to be executed by one or more processors of an existing device, or by using dedicated device hardware.

Figure 9:
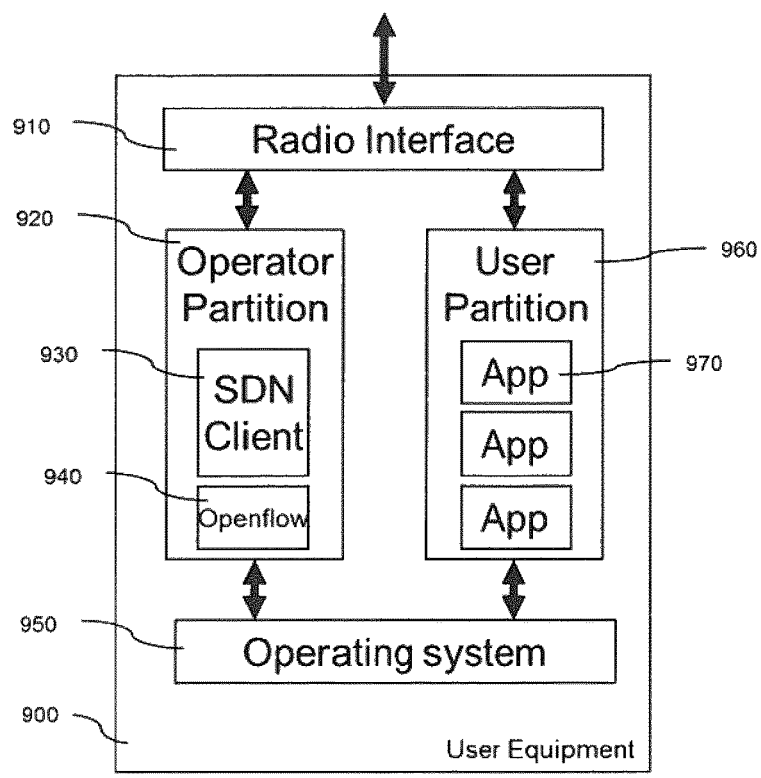
FIG. 9 shows a block diagram of a further embodiment of a User Equipment.

FIG. 9 shows a block diagram of a further embodiment of a User Equipment 900 that is enabled to contribute to the X2 connectivity. A radio interface 910 is adapted to establish radio connection to a further user equipment and/or to a radio base station which may be a eNB. The UE 900 comprises two different partitions: an operator partition 920 and a user partition 960. The user partition 960 comprises telephony and messaging functionalities and user installed applications 970. Therefore the user partition is usable by the user and can be changed or influenced by the user. The operator partition 920 is owned by the operator and may be pre-installed before shipment to the user. The operator partition 920 cannot be changed by the user without approval from the operator and comprises an SDN Client 930 and an OpenFlow stack 940. The SDN Client 930 can be activated and controlled by the SDN Controller 700 via the radio interface 910 of the UE 900. The operator may agree with the user on the bandwidth to be allocated to the X2 connectivity function. That bandwidth may be small by default for all users, but the subscription to the user may be cheaper or even free if the user agrees to dedicate bandwidth to X2 traffic. The operating system 950 is used to control the operator partition 920 and the user partition 960.

Figure 10:
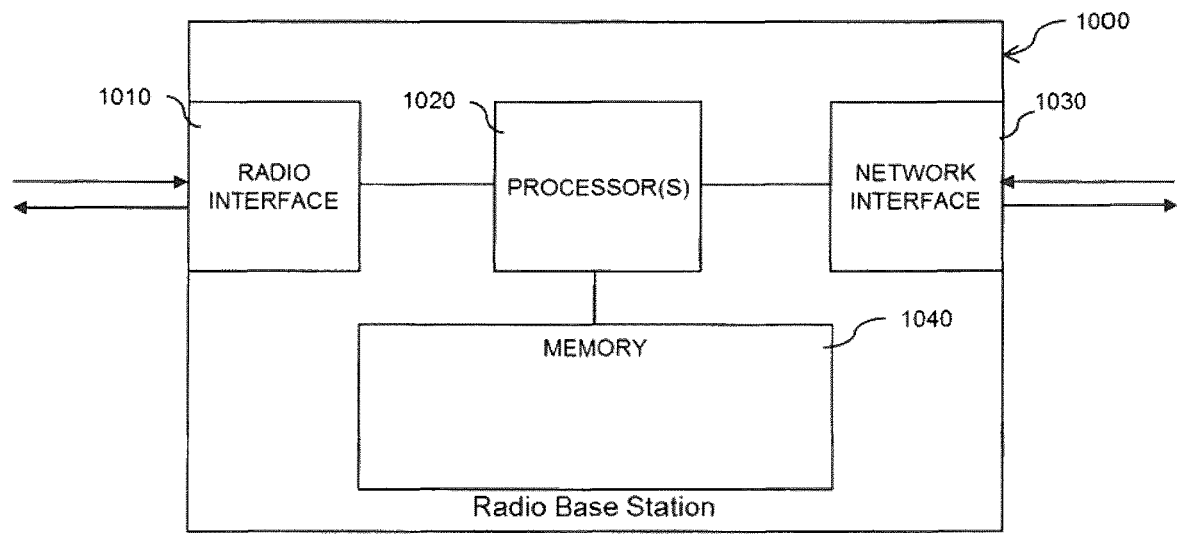
FIG. 10 shows a block diagram of an embodiment of a Radio Base Station.

FIG. 10 shows a block diagram of an embodiment of a Radio Base Station 1000 in a radio access network, wherein the radio access network comprises a further radio base station. A forwarding of data within the radio access network is being controlled by a Software Defined Network, SDN, Controller 600, and the radio base station 1000 and the further radio base station are capable of providing radio connection to a plurality of user equipment, UEs, and being under the control of the SDN Controller 600. The radio base station 1000 is adapted to select at least one UE 800 from the plurality of UEs, wherein the selected at least one UE 800 is located within an overlapping radio connectivity area of the radio base station 1000 and the further radio base station, and indicate an identity of the at least one selected UE 800 to the SDN Controller 600 for activating control of the SDN Controller 600 onto the at least one selected UE 800. The radio base station may further comprise a radio interface 1010 adapted to send or receive data to/from a UE.

According to a further embodiment a Radio Base Station 1000 in a radio access network is provided, wherein the radio access network comprises a further radio base station. A forwarding of data within the radio access network is being controlled by a Software Defined Network, SDN, Controller 600, and the radio base station 1000 and the further radio base station are capable of providing radio connection to a plurality of user equipment, UEs, and being under the control of the SDN Controller 600. The radio base station 1000 comprises a processor 1020 and a memory 1040, said memory 1040 containing instructions executable by said processor 1020. Said radio base station 1000 is operative to select at least one UE from the plurality of UEs, wherein the selected at least one UE is located within an overlapping radio connectivity area of the radio base station 1000 and the further radio base station, and indicate an identity of the at least one selected UE to the SDN Controller for activating control of the SDN Controller onto the at least one selected UE.

According to a further embodiment a Radio Base Station 1000 in a radio access network is provided, wherein the radio access network comprises a further radio base station. A forwarding of data within the radio access network is being controlled by a Software Defined Network, SDN, Controller 600, and the radio base station 1000 and the further radio base station are capable of providing radio connection to a plurality of user equipment, UEs, and being under the control of the SDN Controller 600. The radio base station 1000 comprises a processing module 1020 or processor 1020, operative to select at least one UE from the plurality of UEs, wherein the selected at least one UE is located within an overlapping radio connectivity area of the radio base station 1000 and the further radio base station. The Radio Base Station 1000 further comprises a network interface module 1030 or network interface 1030 adapted to indicate an identity of the at least one selected UE to the SDN Controller for activating control of the SDN Controller onto the at least one selected UE.

It is to be understood that the structure as illustrated in FIG. 10 is merely schematic and that the Radio Base Station 1000 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated. Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

Figure 11:
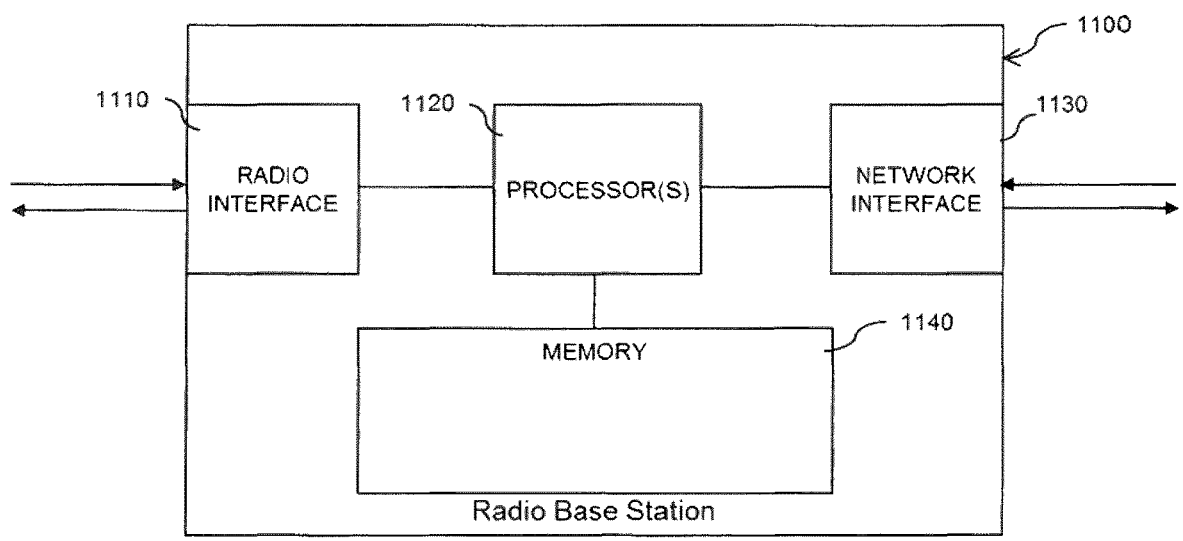
FIG. 11 shows a block diagram of a further embodiment of a Radio Base Station.

FIG. 11 shows a further embodiment of a radio base station 1100 in a radio access network is provided. The radio access network comprises a further radio base station, wherein a forwarding of data within the radio access network is being controlled by a Software Defined Network, SDN, Controller, and wherein the radio base station 1100 and the further radio base station being under the control of the SDN Controller. The radio base station 1100 is adapted to receive instructions from the SDN controller, activate an SDN client for forwarding of data, and thereby enabling control of the SDN Controller onto the radio base station, and receive configuration instructions to forward data destined to a core network and to the further radio base station.

According to a further embodiment a radio base station 1100 in a radio access network is provided. The radio access network comprises a further radio base station, wherein a forwarding of data within the radio access network is being controlled by a Software Defined Network, SDN, Controller, and wherein the radio base station 1100 and the further radio base station being under the control of the SDN Controller. The radio base station 1100 comprises a processor 1120 and a memory 1140, said memory 1140 containing instructions executable by said processor 1120. Said radio base station 1100 is operative to receive instructions from the SDN controller, activate an SDN client for forwarding of data, and thereby enabling control of the SDN Controller onto the radio base station, and receive configuration instructions to forward data destined to a core network and to the further radio base station.

According to a further embodiment a radio base station 1100 in a radio access network is provided. The radio access network comprises a further radio base station, wherein a forwarding of data within the radio access network is being controlled by a Software Defined Network, SDN, Controller, and wherein the radio base station 1100 and the further radio base station being under the control of the SDN Controller. Said radio base station 1100 comprises a receiving module 1130 or network interface 1130 adapted to receive instructions from the SDN controller. The radio base station 1100 further comprises an activation module 1120 or processor 1120 adapted to activate an SDN client for forwarding of data, and thereby enabling control of the SDN Controller onto the radio base station and to receive configuration instructions to forward data destined to a core network and to the further radio base station.

It is to be understood that the structure as illustrated in FIG. 11 is merely schematic and that the Radio Base Station 1100 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated. Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

Figure 12:
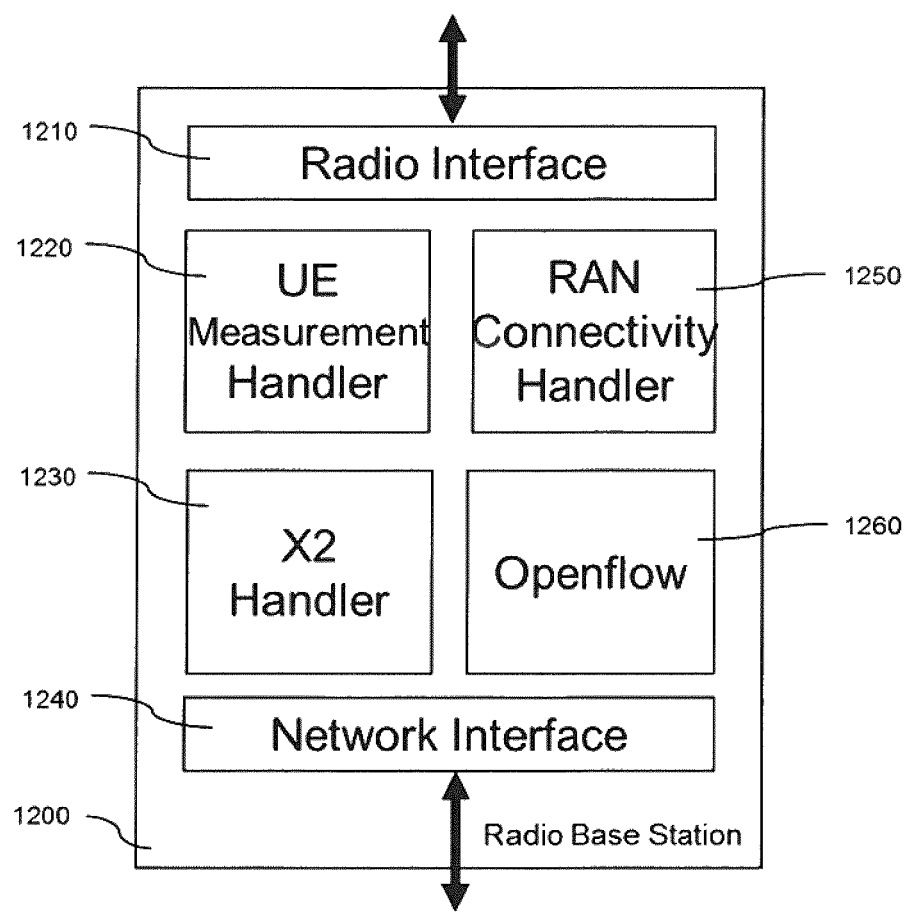
FIG. 12 shows a block diagram of a further embodiment of a Radio Base Station.

FIG. 12 shows a block diagram of a further embodiment of a radio base station 1200. The radio base station 1200 comprises a radio interface 1210 for establishing radio connection with user equipment and a network interface 1240 for establishing X2 connection to other radio base stations or S1 connection to nodes in the core network (e.g. MME or S-GW). The radio base station 1200 further comprises a UE Measurement Handler 1220 which is adapted to receive and store measurement reports received from UEs via the radio interface 1210. Typically UEs report to the radio base station 1200 the radio strength in the current cell and also radio strength in neighboring cells. Based on these measurements the radio base station 1200 builds up a database of UEs currently located in an overlapping radio coverage area with neighboring radio base stations. Further the radio base station 1200 comprises a RAN Connectivity Handler 1250 that is adapted to detect and monitor the connectivity of the radio base station 1200 towards the core network. This module 1250 is further adapted to report to the SDN Controller 600 for build up the Topology database in the SDN Controller 600. A X2 Handler 1230 is adapted to map X2 content to the S1 interface content and convert X2 content received from a UE. An OpenFlow client 1260 is implemented in the radio base station 1200 to allow control by the SDN Controller 600 via OpenFlow messages.

Figure 13:
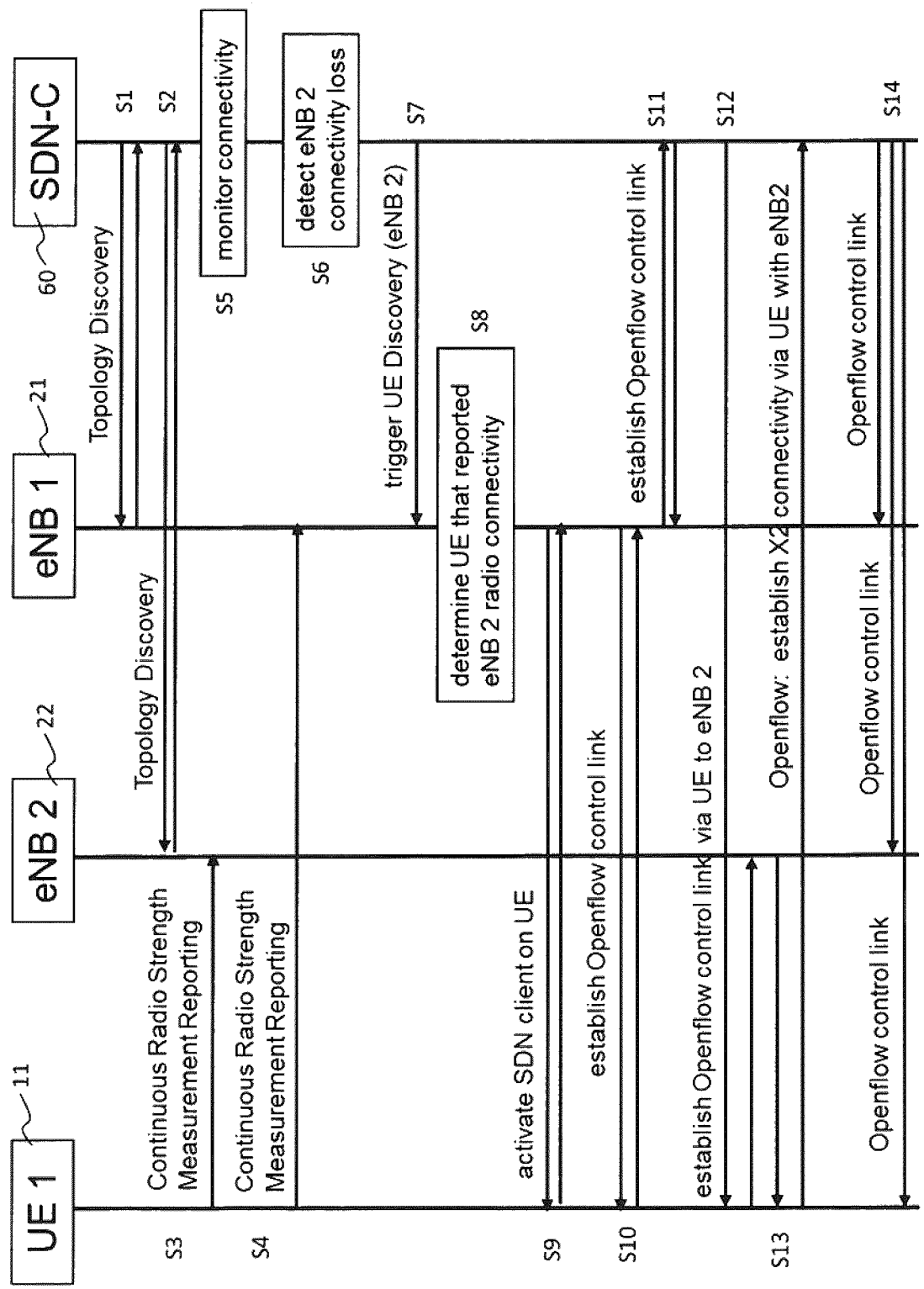
FIG. 13 shows a flow diagram between nodes of an embodiment of a telecommunication network.

FIG. 13 shows a flow diagram between nodes of an embodiment of a telecommunication network. This figure depicts a UE1 11 being in an overlapping radio connectivity area of eNB1 21 and eNB2 22. Further a SDN-C 60 is depicted which is adapted to control the eNB1 21, eNB2 22 and UE1 11. It may be possible to have more or less UEs which are in overlapping radio connectivity areas but due to clarity issues only one UE 11 is depicted.

The same applies for the two depicted eNBs 21, 22 which can be more or fewer. At steps S1 and S2 the SDN-C 60 performs topology discovery of the radio access network the SDN-C 60 is responsible for. In this specific example SDN-C 60 is only responsible for eNB1 21 and eNB2 22. This can be done by discovery broadcast messages or via pre-configuration. This procedure results in a topology database at the SDN-C 60 comprising all eNBs in the responsibility area and their connectivity to the CN. While pre-configuration would work for static eNBs, in case of moving or dynamic distributed eNBs the SDN-C 60 has to perform continuous topology discovery of the RAN it is responsible for. This allows keeping the topology database in the SDN-C 60 up-to-date. The SDN-C 60 monitors the CN connectivity of all eNBs discovered in step S5. By alternative this information may also be pre-configured. It may also be possible to indicate to the SDN-C 60 manually that an eNB has lost connectivity. The monitoring of connectivity may also be done using hardware heartbeat or continuity tests and corresponding reports to the SDN-C 60.

In parallel or after the topology has been discovered the UE1 11 reports radio strength measurements to eNB1 21 and eNB2 22 in steps S3 and S4. Based on these measurement reports each eNB 21, 22 builds up a new database of UEs currently located in an overlapping radio coverage area with neighboring eNBs. The logic applied by the eNB1 21 or eNB2 22 is shown in greater detail in FIG. 3. It may be assumed that each eNB knows its neighboring eNB. The establishment of this new database can be done before a connectivity loss is detected at SDN-C 60 in step S6. The advantage is that the SDN-C 60 can very fast establish an SDN controlled connectivity because all relevant information is already available. However the disadvantage of building the new database before a loss of connection has been detected at one eNB is that this procedure costs power and computing time of all eNBs even if it is not necessary. According to another embodiment the build-up of a new database in each eNB can be done after the loss of connectivity to the core network is detected at an eNB. If this is done after step S6 the overlapping radio coverage area can be restricted to the overlapping radio coverage area with the respective isolated eNB wherein if the isolated eNB is not known the database must comprise all possible scenarios with overlapping radio connectivity areas. If UE1 11 reports a measurement from a neighboring eNB (e.g. eNB2 22) it must be located inside an overlapping radio coverage area of eNB1 21 and eNB2 22. If UE1 11 is not in an overlapping radio coverage area of eNB1 21 and eNB2 22 then UE1 11 is not relevant for the forwarding of data and the flow ends.

According to one embodiment the list of selected at least one UEs which are located within the overlapping radio connectivity area or, in other words, overlapping radio coverage area, is stored at the SDN-C 60. The eNB1 21 or eNB2 22 may further be adapted to determine a trend of the reported radio strength over time by fetching the previous reported measurements and comparing these previous radio strength indications with the current one. If the trend is decreasing and finally reaches a lower threshold the UE1 11 seems to be in a difficult radio coverage condition or is moving away from the overlapping radio coverage area. In this case the UE will be removed from the database at the SDN-C 60. If the trend is increasing above a radio connectivity threshold the UE will be added to the database at the SDN-C 60. According to another embodiment said database is stored in the respective eNBs such that each eNB has its own database with all UEs in overlapping radio coverage areas with all neighboring eNBs. Then it may not be necessary to update the SDN-C 60 in case no connectivity loss of an eNB has been detected. In the example of FIG. 13 all relevant eNBs (eNB1 21 and eNB2 22) have established their own databases based on the received measurement reports for UE1 11.

In step S6 a connectivity loss of eNB2 22 is detected by the SDN-C 60 based on the topology discovery and the result of the monitored connectivity in step S5. After eNB2 22 has been identified as an isolated eNB the SDN-C 60 triggers a UE discovery process at the remaining non-isolated eNB2 22 in step S7. The UE discovery process triggers a determination of UEs at eNB1 21 that reported eNB2 22 radio connectivity and therefore being in an overlapping radio connectivity area of eNB2 22 and eNB1 21 at step S8. In this example only UE1 11 has been identified as the at least one UE which can be used for the forwarding of data between eNB1 21 and eNB2 22. If there are more than one non-isolated eNB under control of the SDN-C 60 a UE discovery trigger will be send to the other non-isolated eNBs as well.

In a next step the OpenFlow control interface must be established in order to put the SDN-C 60 into the position to be able to control both eNB1 21, eNB2 22 and UE1 11 via OpenFlow messages. This can be done by the non-isolated eNB1 21 which activates the SDN client on UE1 11. This message could be a new message of the RRC layer. It may also be applicable that after UE1 11 has been determined in step S8 the eNB1 21 sends back the result to the SDN-C 60 which may then send an SDN client activation message via eNB1 21 to the UE1 11. It may also be applicable that the SDN-C 60 only sends a request to eNB1 21 for activating the SDN client in the selected UE1 11. The UE1 11 receiving such indication or message will then activate the SDN client and also the related OpenFlow stack element. Appropriate authentication may be required to prevent misuses and known security mechanism can be applied such that the UE has been put into a position to verify that a request to activate a function in the operator partition or domain is authentic and authorized. Not all UEs may support this function or may not have an SDN client/OpenFlow stack available in the operator partition. So the UE will comprise a manifest of what functions are available and which are allowed to be used right now. If a UE, e.g. UE1 11, is not supporting this function it would not respond to the SDN client activation request or it would respond with an error indication. Based on this behavior of a non-supporting UE the SDN-C 60 is then able to update its own list of X2 pool UEs. If the activation request is provided by the eNB1 21 as depicted in the FIG. 13 the eNB1 21 will, based on a negative indication from the UE1 11, select a further UE from the list of selected UEs which are in the respective overlapping area.

In case of a support of SDN by the UE1 (positive feedback in S9) the activation of an SDN client at the UE1 11 results into an RRC based tunnel for the OpenFlow signalling from the UE1 11 to the eNB1 21 such that an OpenFlow control link is established between the UE1 11 and the eNB1 21 in step S10. In a next step S11 an OpenFlow control link between the SDN-C 60 and the eNB1 21 is established. If more than one UE has been selected for the forwarding of data between eNB1 21 and eNB2 22 then further OpenFlow control links will be established in addition to the example scenario of FIG. 13. By establishing OpenFlow links between the eNBs and the UEs and OpenFlow links between eNBs and the SDN-C 60 it is now possible to establish OpenFlow control links between the SDN-C 60 and each of the respective UEs in step S12. Control data from the SDN-C 60 to the UE1 11 may be routed physically via the eNB1 21. A direct physical connection between the SDN-C 60 and the UE1 11 may not be available as the SDN-C 60 may not have a radio interface. As a result the SDN-C 60 is now able to control UE1 11 via OpenFlow and set-up and release an X2 relay function in an X2 handler.

In a next step S13 the OpenFlow interface of the isolated eNB2 22 needs to be linked to the SDN-C 60. Since the eNB2 22 is isolated and may not be reachable via the SDN-C 60 over the core network or directly, a connection via UE1 11 must be established. SDN-C 60 sends an instruction via the already established OpenFlow control link to UE1 11 to establish an OpenFlow transport tunnel to the isolated eNB2 22. UE1 11 builds up a parallel radio connection to eNB2 22. Based on this radio connection (also via RRC layer) a tunnel for OpenFlow messages between UE1 11 and eNB2 22 is established. The confirmation on the established OpenFlow control link is returned to the SDN-C 60. In step S14 it is shown that SDN-C 60 has now full control connectivity to eNB1 21, eNB2 22 and UE1 11 to provide forwarding tables to all SDN clients. The SDN-C 60 now uses the OpenFlow signaling to configure X2 interface connectivity from eNB2 22 towards eNB1 21 via the aggregated links of the UE1 11. The isolated eNB2 22 now can resume service since it now has connectivity with the core network via the X2 interface and the eNB1 21 connection to the S-GW 40.

Figure 14:
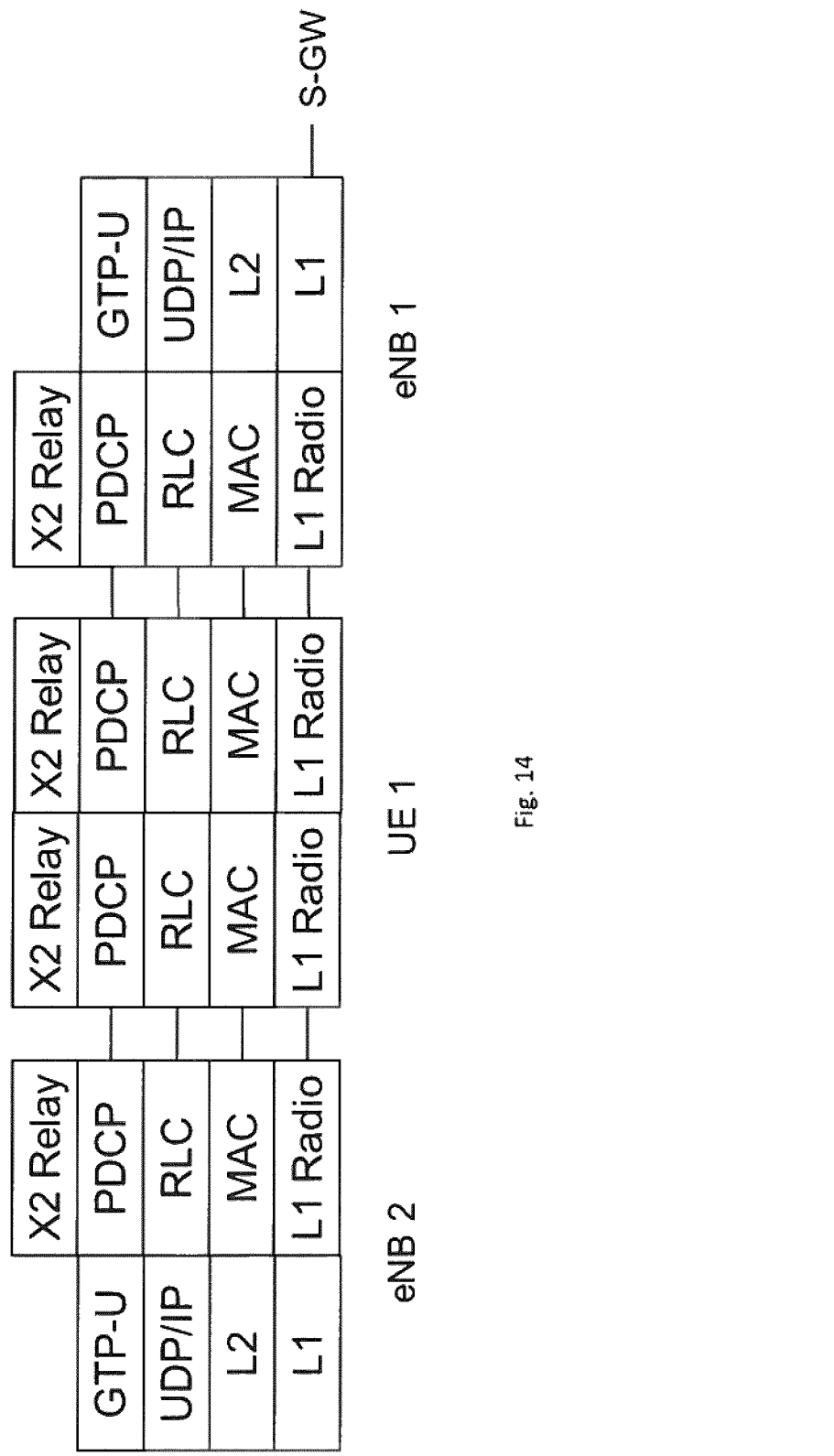
FIG. 14 shows a further schematic illustration of a layered architecture of an embodiment of a telecommunication network.

FIG. 14 shows the protocol stacks for the user plane when forwarding connectivity via UE1 and the X2 interface. The isolated eNB2 maps the GPRS Tunneling Protocol (GTP-U) tunnel to the radio interface, so a X2 relay via PDCP has been established. According to another embodiment the eNB2 may also take a shortcut by not using GTP-U tunneling but map the local UE1s PDCP straight to X2-Relay. The UE1 performs the X2 relay from one radio interface of eNB2 to the other eNB1 radio interface. From eNB1 to the S-GW in the core network the standard GTP-U is used.

Figure 15:
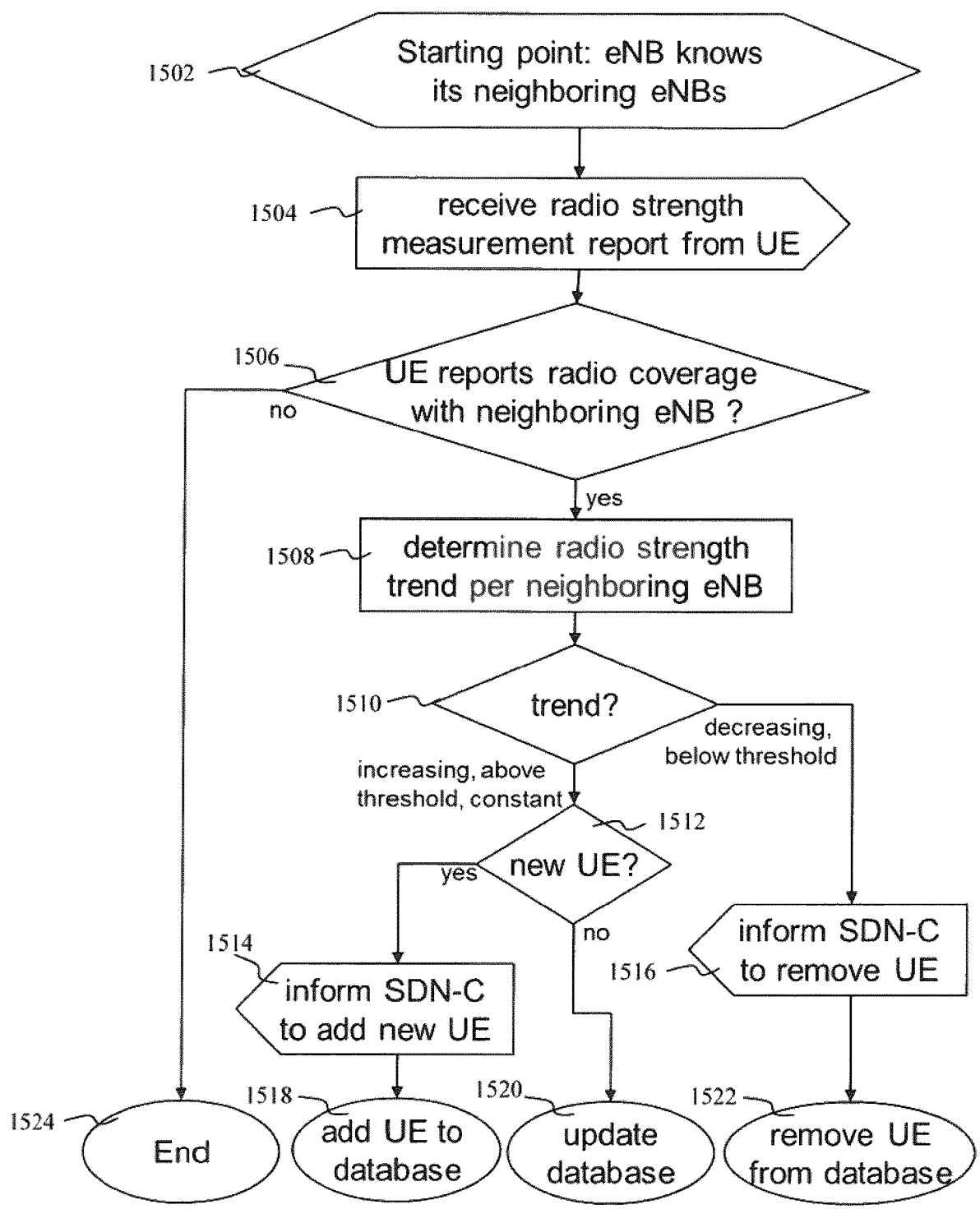
FIG. 15 shows an exemplary sequence diagram for a UE determination process according to various embodiments.

FIG. 15 shows an exemplary sequence diagram for a UE determination process according to various embodiments. According to one embodiment the determination or selection of at least one UE from the plurality of UEs is done in a radio access network node, or eNB. At the starting point 1502 the eNB is aware of its neighboring eNBs and knows e.g. the identity of its neighboring eNBs. In a next step 1504 the eNB receives radio strength measurement reports from a UE which has radio connectivity with this eNB. In step 1506 it is determined, based on the radio strength measurement report if the UE also reports radio coverage with any of the neighboring eNBs such that the UE is in an overlapping radio coverage area of this eNB and one of the neighboring eNBs. If there is no radio coverage with any of the neighboring eNBs then this process stops 1524. If this UE was previously in the database of selected UEs it will be removed in step 1522 (this check has not been depicted in FIG. 15 due to clarity reasons).

If the UE reports radio coverage with neighboring eNBs then a radio strength trend per neighboring eNBs is determined in step 1508. This trend can be determined based on previous radio strength measurements of the same UE. In step 1510 it is determined if the trend is decreasing and has dropped below a certain threshold. If this is the case the SDN-C is informed to remove this UE from the group of selected UEs in step 1516. Further the UE is removed from the database of selected UEs in the eNB in step 1522. If the trend is increasing and above a certain threshold or remain constant it is further checked if the UE is a "new" UE (not already stored in the database). If the UE is new the SDN-C is informed in step 1514 about this new UE which may then be added to the group of selected UEs. Further the UE is added to the database in step 1518. If the UE is not new the database is only updated in step 1520 with the actual radio measurements.

Figure 16:
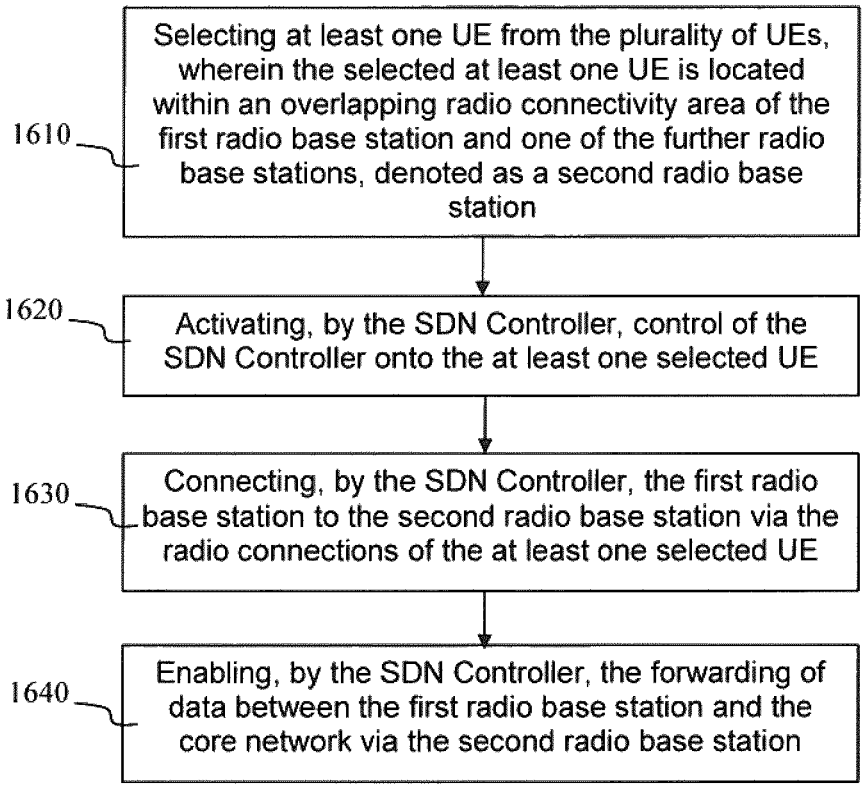
FIG. 16 shows a flow diagram of a method according to various embodiments.

FIG. 16 shows a flow diagram of a method for attaching a first radio base station to a core network via a radio access network according to various embodiments. A forwarding of data within the radio access network is being controlled by a Software Defined Network, SDN, Controller, the radio access network comprising a plurality of further radio base stations being capable of providing radio connection to a plurality of user equipment, UEs, and being under the control of the SDN Controller. In a first step 1610 at least one UE from the plurality of UEs is selected, wherein the selected at least one UE is located within an overlapping radio connectivity area of the first radio base station and one of the further radio base stations, denoted as a second radio base station. In a second step 1620 control of the SDN Controller onto the at least one selected UE is activated by the SDN Controller. In a third step 1630 the first radio base station is connected to the second radio base station via the radio connections of the at least one selected UE by the SDN Controller. In a fourth step 1640 the forwarding of data between the first radio base station and the core network via the second radio base station is enabled by the SDN Controller.

Figure 17:
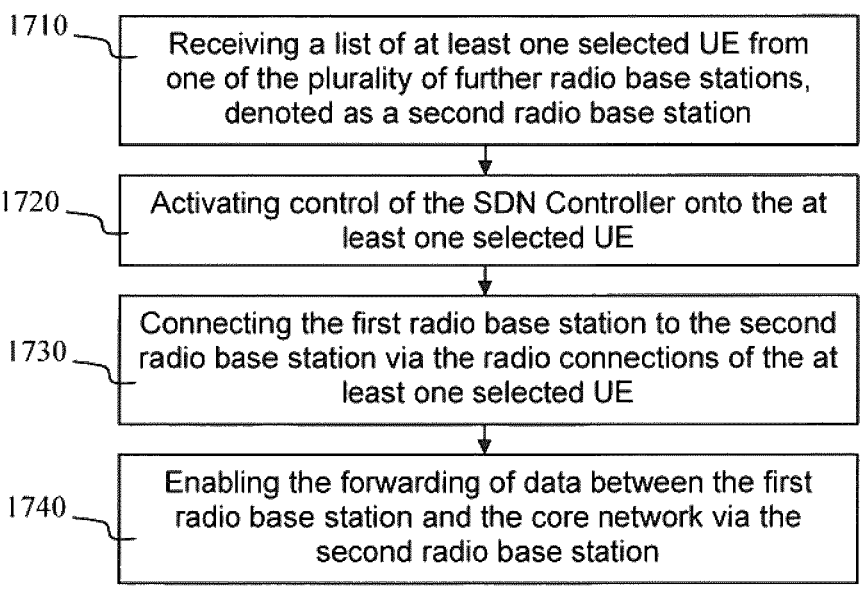
FIG. 17 shows a flow diagram of a method in a SDN Controller according to various embodiments.

FIG. 17 shows a flow diagram of a method in a SDN Controller for controlling a forwarding of data within a radio access network according to various embodiments. The SDN Controller is adapted to control a first radio base station of the radio access network and a plurality of further radio base stations of the radio access network, the first and the plurality of further radio base stations being capable of providing radio connection to a plurality of user equipment, UEs. In a first step 1710 a list of at least one selected UE is received from one of the plurality of further radio base stations, denoted as a second radio base station. In a second step 1720 control of the SDN Controller onto the at least one selected UE is activated. In a third step 1730 the first radio base station is connected to the second radio base station via the radio connections of the at least one selected UE. In a fourth step 1740 the forwarding of data between the first radio base station and the core network via the second radio base station is enabled.

Figure 18:
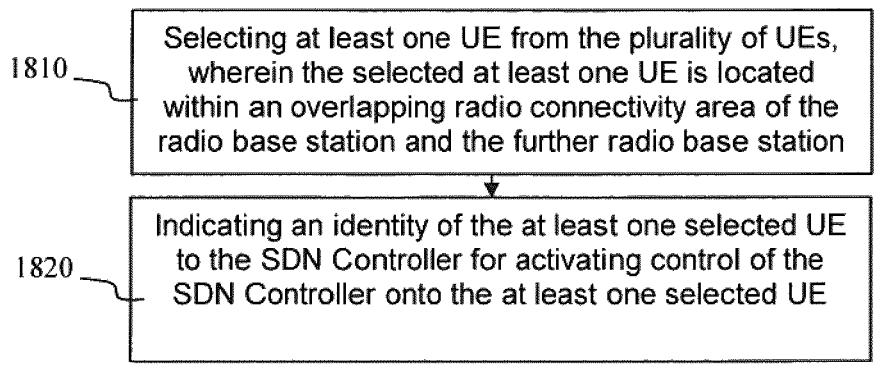
FIG. 18 shows a flow diagram of a method in a radio base station according to various embodiments.

FIG. 18 shows a flow diagram of a method in a radio base station in a radio access network according to various embodiments. The radio access network comprises a further radio base station, wherein a forwarding of data within the radio access network is being controlled by a Software Defined Network, SDN, Controller, and wherein the radio base station and the further radio base station are capable of providing radio connection to a plurality of user equipment, UEs, and being under the control of the SDN Controller. In a first step 1810 at least one UE from the plurality of UEs is selected, wherein the selected at least one UE is located within an overlapping radio connectivity area of the radio base station and the further radio base station. In a second step 1820 an identity of the at least one selected UE is indicated to the SDN Controller for activating control of the SDN Controller onto the at least one selected UE.

Figure 19:
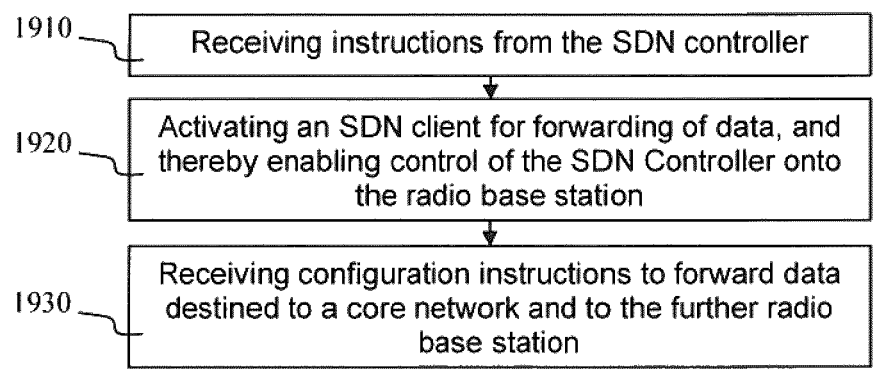
FIG. 19 shows a flow diagram of a further method in a radio base station according to various embodiments.

FIG. 19 shows a flow diagram of a further method in a radio base station in a radio access network according to various embodiments. The radio access network comprises a further radio base station, wherein a forwarding of data within the radio access network is being controlled by a Software Defined Network, SDN, Controller, and wherein the radio base station and the further radio base station being under the control of the SDN Controller. In a first step 1910 instructions from the SDN controller are received. In a second step 1920 an SDN client for forwarding of data is activated, and thereby enabling control of the SDN Controller onto the radio base station. In a third step 1930 configuration instructions to forward data destined to a core network and to the further radio base station are received.

Figure 20:
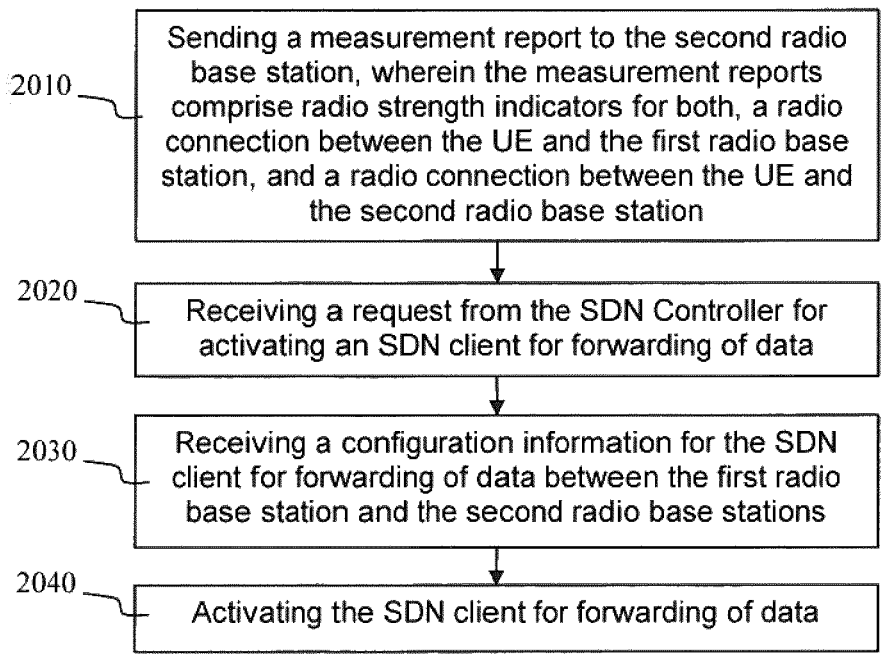
FIG. 20 shows a flow diagram of a method in a User Equipment according to various embodiments.

FIG. 20 shows a flow diagram of a method in a User Equipment being capable of having radio connectivity to a first radio base station of a radio access network and to a second radio base station of the same radio access network when being located in an overlapping radio coverage area according to various embodiments. The first radio base station, the second radio base station and the UE are under the control of a Software Defined Network, SDN, Controller, which controls a forwarding of data within the radio access network. In a first step 2010 a measurement report is sent to the second radio base station, wherein the measurement reports comprise radio strength indicators for both, a radio connection between the UE and the first radio base station, and a radio connection between the UE and the second radio base station. In a second step 2020 a request from the SDN Controller is received for activating an SDN client for forwarding of data. In a third step 2030 a configuration information is received for the SDN client for forwarding of data between the first radio base station and the second radio base stations. In a fourth step 2040 the SDN client for forwarding of data is activated.

The present invention also concerns computer programs comprising portions of software codes or instructions in order to implement the method as described above when operated by at least one respective processing unit of a user device and a recipient device. A carrier may comprise the computer program, wherein the carrier can be one of an electronic signal, optical signal, radio signal, or computer readable storage medium. The computer-readable medium can be a CD-ROM, a DVD, a Blu-ray Disc, a permanent or rewritable memory within the user device or the recipient device or located externally. The respective computer program can also be transferred to the user device or recipient device for example via a cable or a wireless link as a sequence of signals.

The invention claimed is:

1. A method for attaching a first radio base station to a core network via a radio access network, wherein a forwarding of data within the radio access network is being controlled by a Software Defined Network (SDN) Controller, wherein the radio access network comprises a plurality of further radio base stations being capable of providing radio connection to a plurality of user equipment (UE) and being under the control of the SDN Controller, the method comprising:

selecting at least one UE from the plurality of UEs, wherein the selected at least one UE is located within an overlapping radio connectivity area of the first radio base station and one of the further radio base stations, denoted as a second radio base station,
wherein selecting the at least one UE from the plurality of UEs comprises selecting, by the second radio base station, the at least one UE from the plurality of UEs based on radio strength indicators applicable for each UE from the plurality of UEs within the overlapping radio connectivity area, wherein the radio strength indicators indicate radio strength between each UE from the plurality UEs and both the first radio base station and the second radio base station, and
wherein the at least one UE from the plurality of UEs is selected if a movement speed relative to the first radio base station of the at least one UE is below a pre-defined speed threshold;
activating, by the SDN Controller, control of the SDN Controller onto the at least one selected UE;
connecting, by the SDN Controller, the first radio base station to the second radio base station via the radio connections of the at least one selected UE;
enabling, by the SDN Controller, forwarding of data between the first radio base station and the core network via the second radio base station.

2. The method of claim 1, wherein the selecting the at least one UE from the plurality of UEs comprises:

receiving, by the second radio base station, measurement reports from each UE from the plurality of UEs within the overlapping radio connectivity area, wherein the measurement reports comprise radio strength indicators for both a radio connection between each UE from the plurality of UEs and the first radio base station, and a radio connection between each UE from the plurality of UEs and the second radio base station; and selecting the least one UE from the plurality of UEs based on the radio strength measurements.

3. The method of claim 2, wherein the at least one UE from the plurality of UEs is selected if both a) the radio strength indicator indicating a radio strength of radio connection between each of the plurality of UEs and the first radio base station, and b) the radio strength indicator indicating a radio strength of radio connection between each of the plurality of UEs and the second radio base station, are higher than a pre-defined radio strength threshold.

4. The method of claim 1, wherein the identity of the selected at least one UE is reported to the SDN Controller for activating control of the SDN Controller onto the at least one selected UE.

5. The method of claim 4, wherein the identity of the selected at least one UE is reported periodically to the SDN Controller, or if a new UE has been selected to be reported to the SDN Controller, or if a previous selected UE has been de-selected.

6. The method of claim 1, wherein the first radio base station is attached to the radio access network responsive to the detection of a loss of connectivity of the first radio base stations to the core network.

7. The method of claim 6, wherein the SDN Controller requests a list of selected at least one UEs from the second radio base station responsive to the loss of connectivity of the first radio base stations to the core network.

8. The method of claim 1, wherein the SDN Controller determines the second radio base station out of the plurality of further radio base stations based on geographical positions of the plurality of further base stations within the radio access network, or having most UEs located in the overlapping area.

9. The method of claim 8, wherein the SDN Controller determines the second radio base station as the one located closest to the first radio base station.

10. The method of claim 1, wherein the activating, by the SDN Controller, control of the SDN Controller onto the at least one selected UE comprises:

contacting the at least one selected UE;
activating an SDN client on the at least one selected UE for forwarding of data; and
configuring the SDN client on the at least one selected UE for forwarding of data between the first radio base station and the second radio base station.

11. The method of claim 1, wherein the connecting, by the SDN Controller, the first radio base station to the second radio base station via the radio connection of the at least one selected UE comprises:

contacting the first radio base station; and
activating an SDN client on the first radio base station for forwarding of data, thereby enabling control of the SDN Controller onto the first radio base station.

12. The method of claim 10, wherein the SDN Client comprises a function of a Forwarding Element being adapted to forward data packets according to a forwarding table provided by the SDN Controller.

13. The method of claim 1, wherein the SDN Controller is a functionality comprised by a node of the radio access network or a virtual function distributed over the first radio base station and/or at least one of the plurality of further radio base stations.

14. A Software Defined Network (SDN) Controller for controlling a forwarding of data within a radio access network, wherein the SDN Controller is adapted to control a first radio base station of the radio access network and a plurality of further radio base stations of the radio access network, wherein the first and the plurality of further radio base stations are capable of providing radio connection to a plurality of user equipment (UE), the SDN Controller comprising:

processing circuitry;
memory containing instructions executable by the processing circuitry whereby the SDN controller is operative to:
receive a list of at least one selected UE from one of the plurality of further radio base stations, denoted as a second radio base station,
wherein the second radio base station selected the at least one UE from the plurality of UEs based on radio strength indicators applicable for each UE from the plurality of UEs within the overlapping radio connectivity area, wherein the radio strength indicators indicate radio strength between each UE from the plurality UEs and both the first radio base station and the second radio base station, and
wherein the second radio base station selected the at least one UE from the plurality of UEs based on a movement speed relative to the first radio base station of the at least one UE being below a pre-defined speed threshold;
activate control of the SDN Controller onto the at least one selected UE;
connect the first radio base station to the second radio base station via the radio connections of the at least one selected UE; and
enable the forwarding of data between the first radio base station and the core network via the second radio base station.

15. The SDN Controller of claim 14, wherein the instructions are such that the SDN Controller is operative to request the list of selected at least one UEs from the second radio base station responsive to a loss of connectivity of the first radio base station to the core network.

16. The SDN Controller of claim 14, wherein the instructions are such that the SDN Controller is operative to determine the second radio base station out of the plurality of further radio base stations based on geographical positions of the plurality of radio base stations within the radio access network.

17. The SDN Controller of claim 16, wherein the instructions are such that the SDN Controller is operative to determine the second radio base station as the one located closest to the first radio base station.

18. The SDN Controller of claim 14, wherein the instructions are such that the SDN Controller is operative to activate control of the SDN Controller onto the at least one selected UE by:

contacting the at least one selected UE;
activating an SDN client on the at least one selected UE for forwarding of data; and
configuring the SDN client on the at least one selected UE for forwarding of data between the first radio base station and the second radio base station.

19. The SDN Controller of claim 14, wherein the instructions are such that the SDN Controller is operative to connect the first radio base station to the second radio base station via the radio connection of the at least one selected UE by:

contacting the first radio base station; and
activating an SDN Client on the first radio base station for forwarding of data, thereby enabling control of the SDN Controller onto the first radio base station.

20. The SDN Controller of claim 19, wherein the SDN Client is a Forwarding Element which is adapted to forward data packets according to a forwarding table provided by the SDN Controller.

21. The SDN Controller of claim 14, wherein the SDN Controller is a functionality in a node of the radio access network or a virtual function distributed over the first radio base station and/or at least one of the plurality of further radio base stations.

22. A radio base station in a radio access network, wherein the radio access network comprises a further radio base station, wherein forwarding of data within the radio access network is controlled by a Software Defined Network (SDN) Controller; wherein the radio base station and the further radio base station are capable of providing radio connection to a plurality of user equipment (UE) and are under the control of the SDN Controller, the radio base station comprising:
processing circuitry;
memory containing instructions executable by the processing circuitry whereby the radio base station is operative to:
select at least one UE from the plurality of UEs, wherein the selected at least one UE is located within an overlapping radio connectivity area of the radio base station and the further radio base station,
wherein selecting the at least one UE from the plurality of UEs comprises selecting, by the second radio base station, the at least one UE from the plurality of UEs based on radio strength indicators applicable for each UE from the plurality of UEs within the overlapping radio connectivity area, wherein the radio strength indicators indicate radio strength between each UE from the plurality UEs and both the first radio base station and the second radio base station, and
wherein the at least one UE from the plurality of UEs is selected if a movement speed relative to the first radio base station of the at least one UE is below a pre-defined speed threshold; and
indicate an identity of the at least one selected UE to the SDN Controller for activating control of the SDN Controller onto the at least one selected UE.

23. The radio base station of claim 22, wherein the instructions are such that the radio base station is operative to select the at least one UE from the plurality of UEs by selecting the at least one UE from the plurality of UEs based on radio strength indicators applicable for each of the plurality of UEs within the overlapping radio connectivity area, wherein the radio strength indicators indicate radio strength between each of the plurality UEs and both the radio base station and the further radio base station.

24. The radio base station of claim 22, wherein the instructions are such that the radio base station is operative to select the at least one UE from the plurality of UEs by:
receiving measurement reports from each of the plurality of UEs within the overlapping radio connectivity area, wherein the measurement reports comprise radio strength indicators for both a) a radio connection between each of the plurality of UEs and the radio base station, and b) a radio connection between each of the plurality of UEs and the further radio base station; and
selecting at least one UE out of the plurality of UEs based on the radio strength measurements.

25. The radio base station of claim 23, wherein the instructions are such that the radio base station is operative to select the at least one UE out of the plurality of UEs if both a) the radio strength indicator indicating a radio strength of radio connection between each of the plurality of UEs and the radio base station, and b) the radio strength indicator indicating a radio strength of radio connection between each of the plurality of UEs and the further radio base station, are higher than a pre-defined radio strength threshold.

26. The radio base station of claim 24, wherein the instructions are such that the radio base station is operative to report the identity of the selected at least one UEs periodically to the SDN Controller, or if a new UE has been selected to be reported to the SDN Controller, or if a previous selected UE has been de-selected.

* * * * *